US012567084B1

(12) United States Patent
Lin et al.

(10) Patent No.: US 12,567,084 B1
(45) Date of Patent: Mar. 3, 2026

(54) OPTIMIZATION OF DATA PRESENTATION

(71) Applicant: Block, Inc., Oakland, CA (US)

(72) Inventors: Ran Lin, Foster City, CA (US);
Jonathan Lamberts, Denver, CO (US);
Junyan Wang, Lewis Center, OH (US);
Michael Duane, San Francisco, CA
(US)

(73) Assignee: Block, Inc., Oakland, CA (US)

( * ) Notice: Subject to any disclaimer, the term of this
patent is extended or adjusted under 35
U.S.C. 154(b) by 140 days.

(21) Appl. No.: 18/478,726

(22) Filed: Sep. 29, 2023

(51) Int. Cl.
G06Q 30/02 (2023.01)
G06Q 20/32 (2012.01)
G06Q 30/0207 (2023.01)

(52) U.S. Cl.
CPC ....... G06Q 30/0224 (2013.01); G06Q 20/326
(2020.05)

(58) Field of Classification Search
CPC ............. G06Q 30/0224; G06Q 20/326; G06Q
30/0207–30/0277
See application file for complete search history.

(56) References Cited

U.S. PATENT DOCUMENTS

| | | | |
|---|---|---|---|
| 4,758,714 A | 7/1988 | Carlson et al. | |
| 5,752,046 A | 5/1998 | Oprescu et al. | |
| 7,343,496 B1 | 3/2008 | Hsiang et al. | |
| 7,506,956 B2 | 3/2009 | Usui | |
| 7,515,962 B2 | 4/2009 | Lyden | |
| 8,553,055 B1 | 10/2013 | Martell et al. | |

| | | | |
|---|---|---|---|
| 9,092,766 B1 | 7/2015 | Bedier et al. | |
| 9,223,376 B2 | 12/2015 | Derbyshire et al. | |
| 10,140,604 B1 | 11/2018 | Douthat et al. | |
| 10,210,536 B1 * | 2/2019 | Wai ..................... | G06Q 30/0247 |
| 10,380,471 B2 | 8/2019 | Locke et al. | |
| 10,733,589 B2 | 8/2020 | Douthat et al. | |
| 11,341,523 B1 * | 5/2022 | Jacoby ................... | G06Q 20/20 |
| 11,494,782 B1 * | 11/2022 | Jacoby ................ | G06Q 20/351 |

(Continued)

FOREIGN PATENT DOCUMENTS

| | | |
|---|---|---|
| DE | 201 22 899 U1 | 9/2009 |
| EP | 1205895 A2 | 5/2002 |

(Continued)

OTHER PUBLICATIONS

Fujioka et al., "Security of Sequential Multiple Encryption", Progress in Cryptology—LATINCRYPT 2010, pp. 20-39 (Aug. 8, 2010) (Abstract Only).

*Primary Examiner* — Thuy N Nguyen
(74) *Attorney, Agent, or Firm* — Lee & Hayes, P.C.

(57) ABSTRACT

Optimizing the presentation of data is described. A payment service computing platform may apply a trained artificial intelligence (AI) model to user data associated with users of a payment service, wherein the trained AI model associates a value with each of the users, and wherein the value represents a predicted engagement metric indicating a change in a level of engagement if an individual user of the users is offered an incentive having a particular attribute. The payment service computing platform may generate the incentive having the particular attribute, identify a subset of the users based at least in part on the value, and cause the incentive to be presented via a user interface of a payment application associated with the payment service and executing on a device of a user in the subset.

18 Claims, 13 Drawing Sheets

(56)  References Cited

U.S. PATENT DOCUMENTS

| | | | |
|---|---|---|---|
| 11,561,593 B2 | 1/2023 | Douthat et al. | |
| 11,798,025 B1* | 10/2023 | Ghosh | G06Q 30/0243 |
| 12,271,746 B1* | 4/2025 | Sardari | G06Q 20/10 |
| 2004/0251908 A1 | 12/2004 | Knopf | |
| 2009/0089599 A1 | 4/2009 | Westwick et al. | |
| 2009/0317161 A1 | 12/2009 | Vo et al. | |
| 2010/0220136 A1 | 9/2010 | Sheahan et al. | |
| 2011/0019234 A1 | 1/2011 | Nakamura | |
| 2011/0080422 A1 | 4/2011 | Lee et al. | |
| 2012/0060041 A1 | 3/2012 | Hashimoto | |
| 2012/0215618 A1* | 8/2012 | Myman | G06Q 30/02 |
| | | | 705/14.1 |
| 2013/0103190 A1 | 4/2013 | Carapelli | |
| 2013/0226784 A1* | 8/2013 | He | G06Q 40/02 |
| | | | 705/38 |
| 2014/0021254 A1 | 1/2014 | Marshall et al. | |
| 2014/0114741 A1* | 4/2014 | Genc-Kaya | G06Q 30/0247 |
| | | | 705/14.41 |
| 2014/0249942 A1 | 9/2014 | Hicks et al. | |
| 2014/0268458 A1 | 9/2014 | Luciani et al. | |
| 2015/0186925 A1* | 7/2015 | Chittilappilly | G06Q 30/0242 |
| | | | 705/14.41 |
| 2015/0199882 A1 | 7/2015 | Fernando et al. | |
| 2015/0220999 A1* | 8/2015 | Thornton | H04M 15/805 |
| | | | 705/14.66 |
| 2015/0254621 A1 | 9/2015 | Matsumoto | |
| 2015/0269805 A1 | 9/2015 | Korala | |
| 2016/0064979 A1 | 3/2016 | Huang et al. | |
| 2016/0125376 A1 | 5/2016 | Beatty et al. | |
| 2016/0211843 A1 | 7/2016 | Wang | |
| 2016/0282892 A1 | 9/2016 | Saavedra et al. | |
| 2016/0307171 A1 | 10/2016 | Haga | |
| 2016/0334470 A1 | 11/2016 | Sandhu et al. | |
| 2016/0335132 A1 | 11/2016 | Ash et al. | |
| 2017/0017943 A1 | 1/2017 | Bilhan et al. | |
| 2017/0076269 A1 | 3/2017 | Saeed et al. | |
| 2017/0184642 A1 | 6/2017 | Menard et al. | |
| 2017/0300893 A1 | 10/2017 | Sasaki et al. | |
| 2018/0232762 A1* | 8/2018 | Greene | G06Q 30/0255 |
| 2018/0366978 A1 | 12/2018 | Vatan et al. | |
| 2019/0019213 A1* | 1/2019 | Silberman | G06Q 30/0244 |
| 2019/0205905 A1* | 7/2019 | Raghunathan | G06F 18/214 |
| 2021/0365973 A1* | 11/2021 | Guild | G06Q 30/0235 |
| 2023/0051225 A1* | 2/2023 | Nair | G06F 18/285 |
| 2023/0124224 A1 | 4/2023 | Douthat et al. | |
| 2023/0252521 A1* | 8/2023 | Vanderveld | G06N 5/01 |
| | | | 705/14.66 |
| 2023/0316280 A1* | 10/2023 | Sardari | G06Q 20/4015 |
| | | | 705/64 |
| 2024/0070703 A1* | 2/2024 | Guild | G06Q 30/0211 |

FOREIGN PATENT DOCUMENTS

| | | | |
|---|---|---|---|
| EP | 2 965 167 A1 | 1/2016 | |
| EP | 3616172 A1 | 3/2020 | |
| JP | 2000-071580 A | 3/2000 | |
| JP | 2002-137506 A | 5/2002 | |
| JP | 2003-316558 A | 11/2003 | |
| JP | 2004-351899 A | 12/2004 | |
| JP | 2007-042103 A | 2/2007 | |
| JP | 2008-176390 A | 7/2008 | |
| JP | 2011-138424 A | 7/2011 | |
| JP | 2013-086448 A | 5/2013 | |
| JP | 2013-222444 A | 10/2013 | |
| JP | 2014-232479 A | 12/2014 | |
| JP | 2015-170356 A | 9/2015 | |
| JP | 2016-514442 A | 5/2016 | |
| JP | 2017-056698 A | 3/2017 | |
| JP | 2021-177405 A | 11/2021 | |
| WO | 2018/200732 A1 | 11/2018 | |

* cited by examiner

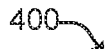
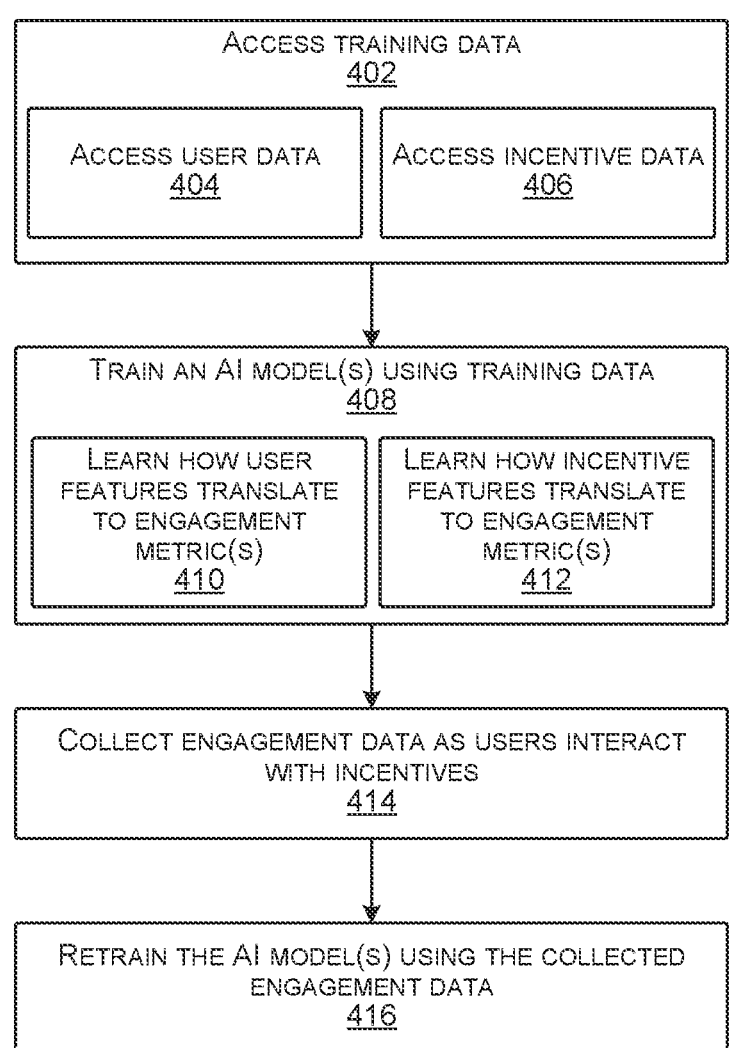
FIG. 4

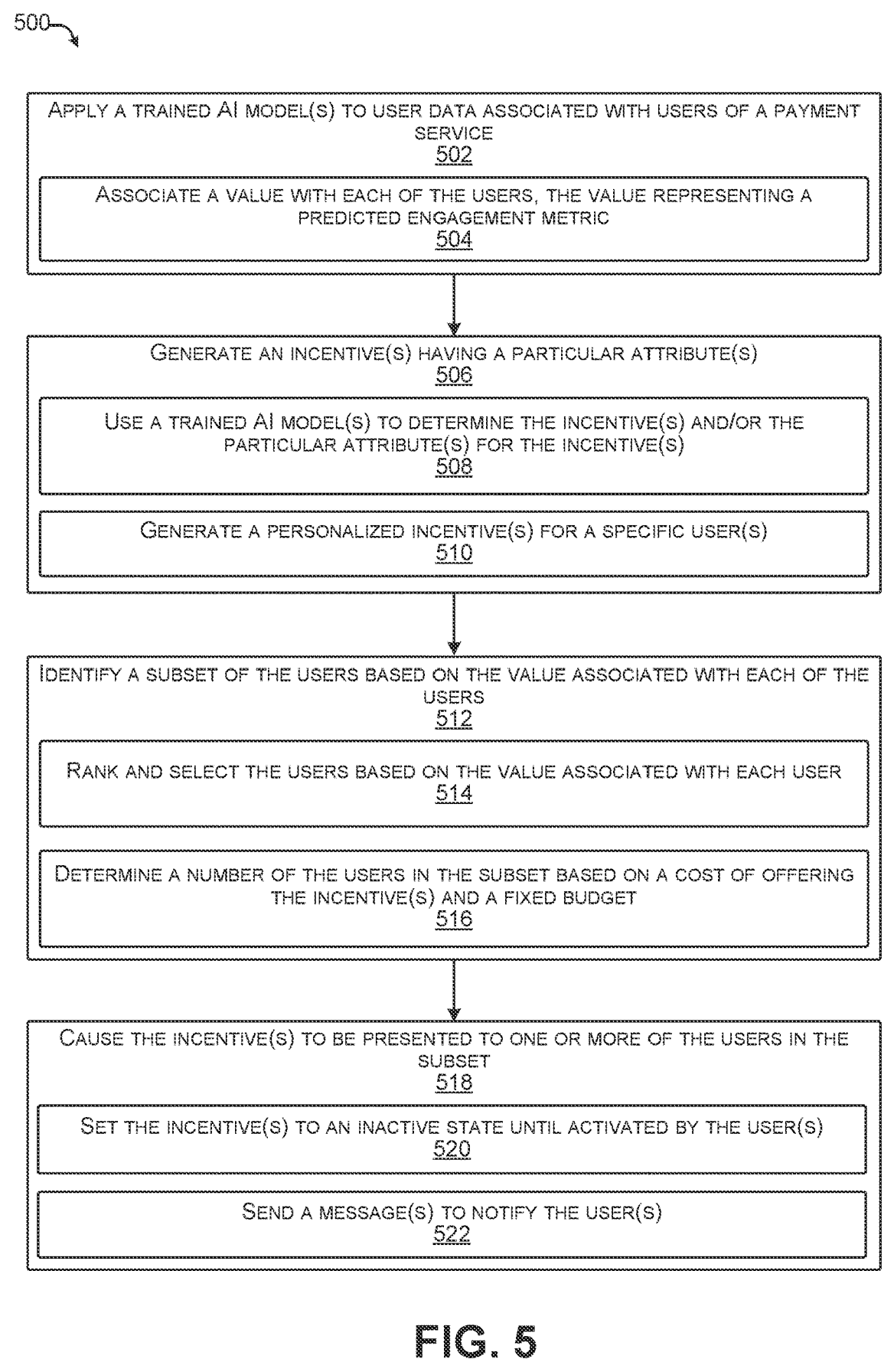

500

APPLY A TRAINED AI MODEL(S) TO USER DATA ASSOCIATED WITH USERS OF A PAYMENT SERVICE
502

ASSOCIATE A VALUE WITH EACH OF THE USERS, THE VALUE REPRESENTING A PREDICTED ENGAGEMENT METRIC
504

GENERATE AN INCENTIVE(S) HAVING A PARTICULAR ATTRIBUTE(S)
506

USE A TRAINED AI MODEL(S) TO DETERMINE THE INCENTIVE(S) AND/OR THE PARTICULAR ATTRIBUTE(S) FOR THE INCENTIVE(S)
508

GENERATE A PERSONALIZED INCENTIVE(S) FOR A SPECIFIC USER(S)
510

IDENTIFY A SUBSET OF THE USERS BASED ON THE VALUE ASSOCIATED WITH EACH OF THE USERS
512

RANK AND SELECT THE USERS BASED ON THE VALUE ASSOCIATED WITH EACH USER
514

DETERMINE A NUMBER OF THE USERS IN THE SUBSET BASED ON A COST OF OFFERING THE INCENTIVE(S) AND A FIXED BUDGET
516

CAUSE THE INCENTIVE(S) TO BE PRESENTED TO ONE OR MORE OF THE USERS IN THE SUBSET
518

SET THE INCENTIVE(S) TO AN INACTIVE STATE UNTIL ACTIVATED BY THE USER(S)
520

SEND A MESSAGE(S) TO NOTIFY THE USER(S)
522

FIG. 5

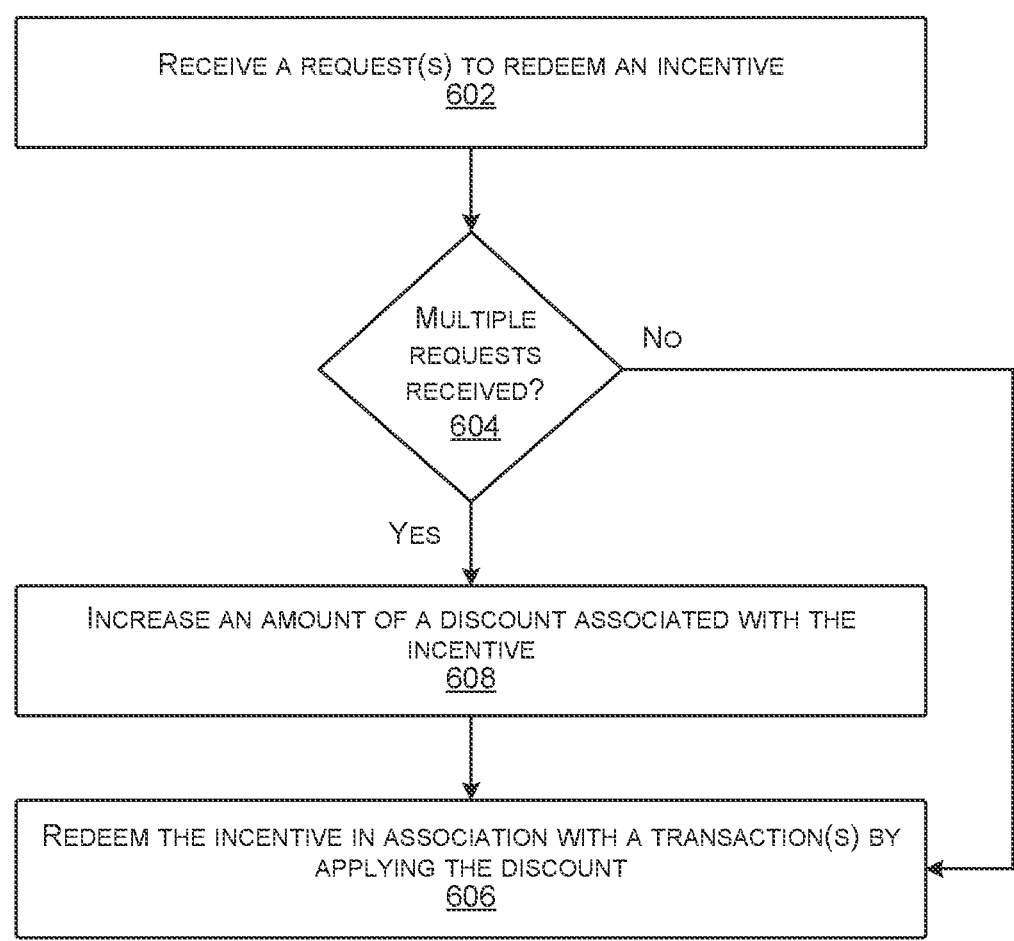
RECEIVE A REQUEST(S) TO REDEEM AN INCENTIVE
602
MULTIPLE REQUESTS RECEIVED?
604
No
Yes
INCREASE AN AMOUNT OF A DISCOUNT ASSOCIATED WITH THE INCENTIVE
608
REDEEM THE INCENTIVE IN ASSOCIATION WITH A TRANSACTION(S) BY APPLYING THE DISCOUNT
606
FIG. 6

700

RECEIVE TRANSACTION DATA ASSOCIATED WITH A FIRST USER GROUP, THE TRANSACTION DATA INDICATING MERCHANTS THAT THE FIRST USER GROUP TRANSACTED WITH
702

RECEIVE ENGAGEMENT DATA ASSOCIATED WITH A SECOND USER GROUP, THE ENGAGEMENT DATA INDICATING ARTISTS THAT THE SECOND USER GROUP ENGAGED WITH
704

DETERMINE A USER SEGMENT OF USERS IN BOTH USER GROUPS
706

IDENTIFY, BASED ON THE USER SEGMENT, AN ARTIST AND A MERCHANT TO PROVIDE A PARTNERSHIP RECOMMENDATION
708

PROVIDE THE PARTNERSHIP RECOMMENDATION TO ONE OR BOTH OF THE ARTIST AND THE MERCHANT, THE PARTNERSHIP RECOMMENDATION ESTABLISHING A COMMUNICATION CHANNEL BETWEEN THE ARTIST AND THE MERCHANT
710

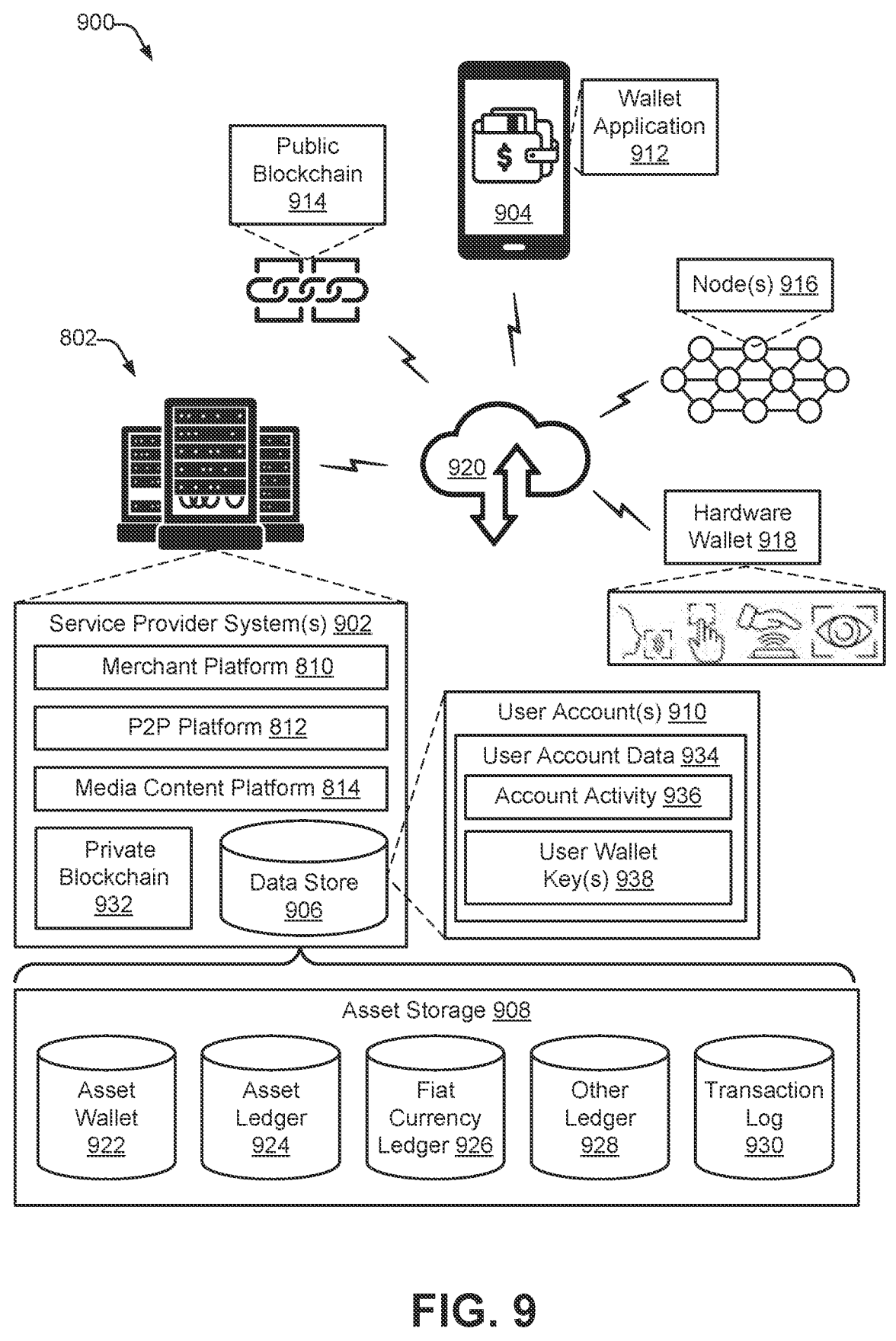

Public Blockchain 914

Wallet Application 912

904

Node(s) 916

920

Service Provider System(s) 902

Merchant Platform 810

P2P Platform 812

Media Content Platform 814

Private Blockchain 932

Data Store 906

Hardware Wallet 918

User Account(s) 910

User Account Data 934

Account Activity 936

User Wallet Key(s) 938

Asset Storage 908

Asset Wallet 922

Asset Ledger 924

Fiat Currency Ledger 926

Other Ledger 928

Transaction Log 930

FIG. 9

OPTIMIZATION OF DATA PRESENTATION

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings.

FIG. 4 is an example process for training one or more artificial intelligence (AI) models, according to an implementation of the present subject matter.

FIG. 5 is an example process for optimizing the presentation of data, according to an implementation of the present subject matter.

FIG. 6 is an example process for dynamically adjusting an amount of a discount associated with an incentive based on a number of users who collectively request to redeem the incentive, according to an implementation of the present subject matter.

FIG. 7 is an example process for providing a partnership recommendation to one or both of an artist or a merchant, according to an implementation of the present subject matter.

FIG. 9 is an example environment for performing techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
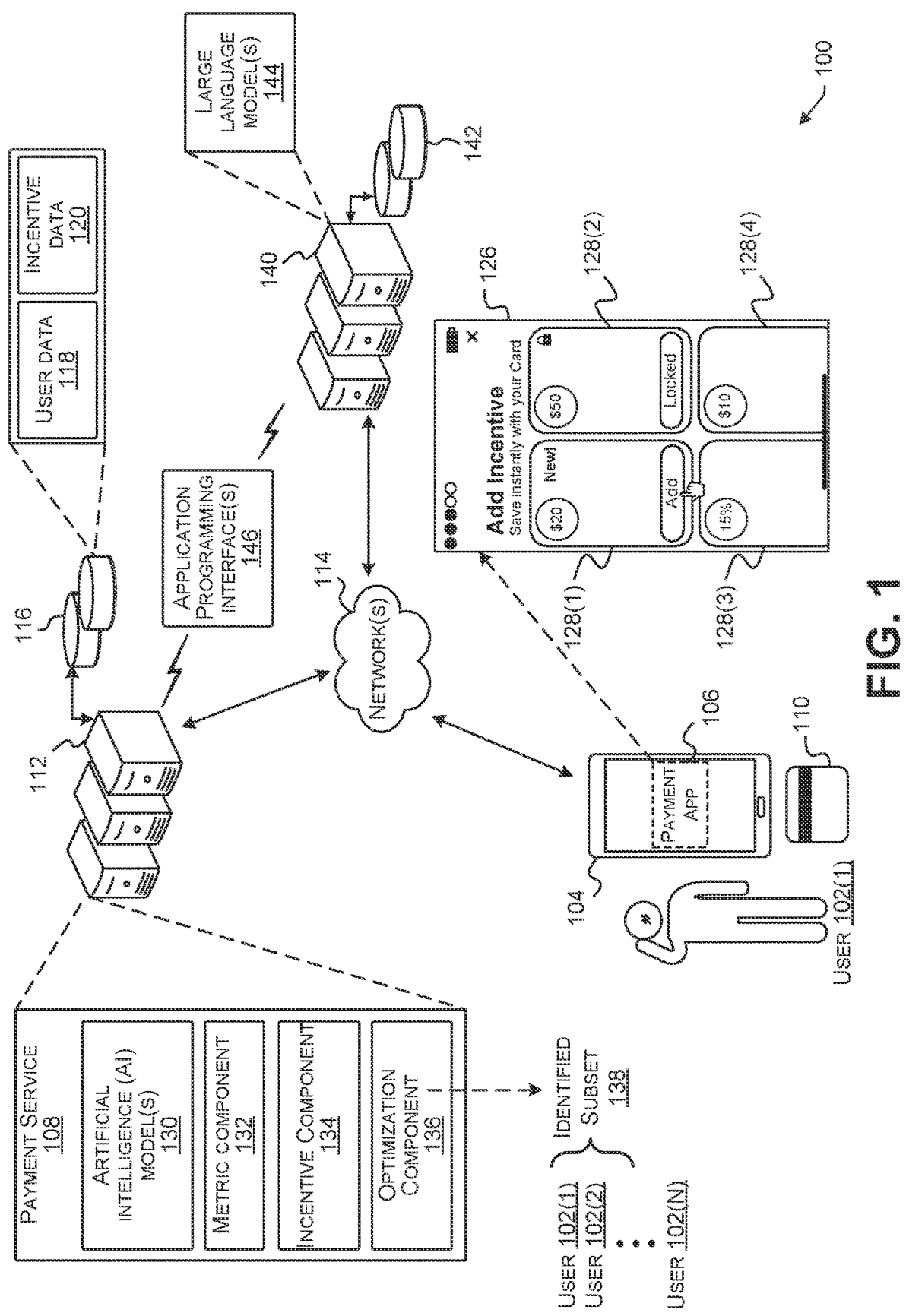
FIG. 1 is an example environment for optimizing the presentation of data, according to an implementation of the present subject matter.

Described herein are, among other things, techniques, devices, and systems for optimizing the presentation of data. For example, a trained AI model(s) can be used to determine which users, of a user population, are to be presented with data based on a likelihood of the users changing their level of engagement (e.g., with a payment application, with a payment service, with a payment instrument, etc.) in response to the presentation of the data. In this manner, computing resources can be conserved by selectively presenting data to an identified subset of the users who are most likely to change (e.g., increase) their level of engagement in response to the presentation of the data. In an example, a payment service computing platform can apply a trained AI model(s) to user data associated with users of a payment service to determine the likelihood of each user changing their level of engagement if they are offered an incentive having a particular attribute(s). For example, the trained AI model(s) may associate a value with each user in a set of the payment service users, the value representing a predicted engagement metric indicating a change in a level of engagement if an individual user is offered the incentive having the particular attribute(s). Based at least in part on these AI-generated values, the payment service computing platform can identify a subset of the users who are to be presented with data (e.g., incentives). Accordingly, for a given user in the identified subset, the payment service computing platform can generate an incentive having a particular attribute(s), and cause the incentive to be presented via a user interface of a payment application associated with the payment service and executing on a device of the user. In this manner, the payment service computing platform targets the right users with the right data (e.g., incentives) at the right times across the respective lifecycles of the users and the incentives. As mentioned, such techniques conserve computing resources (e.g., processing resources, networking resources, etc.) by selectively causing data (e.g., incentives) to be presented to an identified subset of the users of the payment service, and in doing so, computing resources are not utilized for presenting the data to the remaining users who may be far less likely to increase their level of engagement in response to the presentation of the data. In some examples, the data (e.g., incentives) can be presented as a result(s) to a search query, whereby the selective data presentation techniques described herein can be used to present a subset of all data (e.g., incentives) in a targeted, timely manner that is particularly useful for user devices with small form factors or limited display surface area.

In an example, a payment application may be serviced by a computing platform associated with a payment service (hereinafter, a "payment service computing platform"). Instances of the payment application execute on electronic devices of users to facilitate transactions and other operations as described herein. In at least one example, the payment application allows for the efficient transfer of funds (e.g., fiat currency, securities (e.g., stocks, bonds, mutual funds), cryptocurrencies, gift cards, etc.) between users of the payment service. Such transfers can be "efficient" in that they can happen electronically, in real-time or near real-time, due to a complex integration of software and hardware components configured to facilitate such transfers. In some examples, each user of the payment service has an account (e.g., a spending account) with the payment service, and each user can add funds to a stored balance associated with their account so that the funds can be accessed to make payments, and/or so that funds can be added to the account when payments are received (e.g., from other users of the payment service).

In the examples described herein, a service provider of the payment service may offer the users a payment instrument (e.g., a debit card, a credit card, etc.). If a user decides to order the payment instrument, the user becomes a "card-holding user" who can thereafter make payments (e.g., to other users or merchants) using the payment instrument (e.g., online, in stores, etc.) with funds available in the user's account (e.g., spending account). In an example, if a card-holding user uses the payment instrument to conduct a transaction (e.g., to purchase an item(s) online or at a point of sale (POS)), assuming the stored balance in the user's account is sufficient to cover the transaction amount, the transaction is completed and funds equal to the transaction amount are withdrawn from the stored balance.

The service provider of the payment service may also provide incentives to users. Incentives may be provided to users for performance of an action(s) or to incentivize performance of an action(s). As an example, non-card-holding users may be offered sign-on incentives in exchange for ordering the payment instrument mentioned above. As another example, card-holding users may be offered engagement incentives in exchange for using the payment instrument. In some examples, an incentive incentivizes a user to change their level of engagement with the payment application, with the payment service, and/or with the payment instrument. In some examples, an incentive incentivizes a user to achieve a certain level of usage (e.g., of the payment application, of the payment service, and/or of the payment instrument), such as completing an above-threshold number of transactions over a prescribed time period.

In at least one example, data (e.g., incentive(s)) can be presented within one or more user interfaces displayed via the payment application. Although incentives are designed to incentivize particular user behavior, there is often a population of users who are not incentivized to change their behavior despite being presented with an incentive(s). Because conventional systems present data (e.g., incentives) somewhat haphazardly to users, computing resources (e.g., processing resources, networking resources, etc.) are inefficiently utilized and/or wasted in conventional systems because at least some users do not change their behavior as a result of being presented with irrelevant data (e.g., incentives) and/or being presented with data (e.g., incentives) at inconvenient or irrelevant times.

The techniques, devices, and systems described herein train and utilize an AI model(s) to optimize the presentation of data (e.g., incentives). For example, user data can be collected by a payment service computing platform as new users are onboarded to a payment service, and as many of those users continue to use the payment service to, among other things, complete transactions using a payment application executing on their electronic devices and/or using a payment instrument obtained from a service provider of the payment service. Over time, one can appreciate that a large collection of historical user data tied to registered user accounts may be available to the payment service computing platform. The payment service computing platform can then train one or more AI models based at least in part on a portion of the previously collected user data as a training dataset, whereby the AI model(s) can learn to make one or more predictions about users. Users can differ in the way that they engage with the payment application, with the payment service, and/or with their payment instrument. Moreover, the payment service may offer a variety of incentives having different attributes, such as an amount of a discount, an amount of fiat currency (e.g., a dollar amount), stock, cryptocurrency, or other asset, an offer frequency, a time period for which the incentive is active, a merchant with which the incentive can be redeemed, and/or a type of the incentive (e.g., a reward type). Accordingly, the trained AI model(s) can analyze unique pairings between users and incentives, and generate a likelihood of an individual user changing their level of engagement and/or predict an amount by which the individual user will change their level of engagement if the user is offered an incentive having a particular attribute(s). In some examples, the trained AI model(s) may associate, with users of the payment service, values that represent predicted engagement metrics, each predicted engagement metric indicating a change in a level of engagement if an individual user is offered an incentive having a particular attribute(s). In this way, the payment service computing platform can utilize the values generated by the trained AI model(s) to intelligently optimize the allocation of computing resources for presenting incentives to a subset of the users, such as a subset of the users who are most likely to change (e.g., increase, decrease, etc.) their level of engagement if they are presented with the incentive(s), and/or a subset of the users who are predicted to change (e.g., increase, decrease, etc.) their level of engagement by the greatest amount if they are presented with the incentive(s).

The techniques, devices, and systems described herein provide a technical solution to a computer-centric problem. Conventional systems present data (e.g., incentives) somewhat haphazardly to users. By taking this "unscientific" approach to presenting data, and in view of the constraints on what can be offered to users, a substantial number of the users who are presented with the data (e.g., incentives) are unlikely to change their behavior in response to the presentation of the data. The techniques, devices, and systems described herein utilize a trained AI model(s) to identify a subset of users who are most likely to change (e.g., increase, decrease, etc.) their level of engagement (e.g., with the payment application, with the payment service, and/or with the payment instrument) and/or engage more or less than other users if presented with particular data (e.g., incentives), which allows for presenting the data (e.g., incentives) to the identified subset of users. This provides an advantage over conventional systems of targeting the right users with the right data (e.g., incentives) at the right times.

The techniques, devices, and systems described herein can drive user engagement and increase retention of engaged users by leveraging AI model(s) to dynamically present data (e.g., incentives) to individual users. For example, the values representing predicted engagement metrics that are generated by the trained AI model(s) can be utilized to intelligently allocate computing resources for the presentation of data (e.g., incentives) to drive engagement and/or increase retention of engaged users who are most likely to engage and/or to engage more than other users if presented with the data (e.g., incentives). In some examples, the techniques, devices and systems described herein may determine incentives that are personalized and/or customized to specific users. That is, a first user may be presented with a first incentive in exchange for ordering the payment instrument, a second user may be presented with a second, different incentive in exchange for ordering the payment instrument, and so on and so forth for any number of different users. In this way, any given user may be presented with a user-specific incentive, which means that different users may be presented with different incentives. In some examples, users may be presented with time-specific incentives, which means that the same user may be presented with different incentives at different instances in time, based at least in part on the time of day, day of the week, etc. One or more of these techniques may help to drive further user engagement (e.g., by targeting the right users with the right data (e.g., incentives) at the right times).

As mentioned, in some examples, the data (e.g., incentives) can be presented as a result(s) to a search query. For example, a search service associated with the payment service computing platform may enable users to search for incentives, offers, merchants, items, or the like by submitting a search query within the payment application. In conventional search techniques, search results are not generated based on predicted engagement metrics. As such, when a user of a conventional search service receives a search result in response a search query, the user may not change their level of engagement in response to the presentation of the data (e.g., incentives) returned in the search result. By presenting search results based on the predicted engagement metrics described herein, techniques described herein can ensure that the search results (e.g., incentives) presented in response to a user's search query are likely to change (e.g., increase, decrease, etc.) the user's level of engagement (e.g., with the payment application, with the payment service, and/or with the payment instrument) and/or cause the user to engage more or less than other users. These techniques, and potentially other techniques of filtering and/or ranking search results so that relevant results are presented to users, can improve functionality of computing devices by causing user interfaces to be less cluttered and easier to interact. For small form factors, such as mobile devices or wearables, this personalization or customization can optimize how content is displayed and accessed, thereby offering an improvement to the functionality of computing devices.

Techniques described herein enable dynamic decisions based on minimal information about users. In conventional techniques, service providers of services, such as payment services, often are unable to determine enough information about certain users to accurately predict whether those users will change their behavior in response to the presentation of particular data (e.g., incentive(s) having a particular attribute(s)). For example, when a user is being onboarded to the payment service, the user may provide minimal information (e.g., a phone number or an email address), and the payment service computing platform may have no other information about the user. The techniques, devices, and systems described herein can present relevant data (e.g., incentives) to such users, in part by leveraging external resources that are integrated into the payment service computing platform. For example, an external large language model (LLM) can be trained on a larger corpus of data and integrated into the payment service computing platform, for example by one or more application programming interfaces (APIs), software development kits (SDKs), or the like, and the output of the external LLM can improve the relevance of the data (e.g., incentives) presented to users of the payment service. This approach can be particularly useful where user data for a particular user is non-existent or below a threshold (e.g., when the user is onboarding to the payment service).

While several examples presented herein are directed to optimizing the presentation of data in the context of a payment service, the techniques described herein are also applicable to other types of services such as electronic commerce (ecommerce) services, social networking services, gaming services, a merchant service, a loyalty program service, a loan service (e.g., capital loan, buy now pay later loan, etc.), a music, podcast and/or video streaming service, or the like. In addition, while several examples presented herein describe the presentation of data in the form of an incentive(s), the data that is presented can be other types of data, such as offers (e.g., buy now, pay later loan offers, loans, etc.), merchants, items (e.g., products), or the like. Further, as described above, techniques described herein can be applicable to any type of incentive offering, whether related to a payment application, a payment service, a payment instrument, or another application, service, and/or instrument.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 is an example environment 100 for optimizing the presentation of data, according to an implementation of the present subject matter. As depicted, the example environment 100 may include users 102, such as the user 102(1). The users 102 may be associated with respective electronic devices, such as the electronic device 104 shown in FIG. 1. The electronic devices (e.g., the electronic device 104) are configured to execute respective applications, such as a payment application 106. The payment applications (e.g., the payment application 106), when executing on the respective electronic devices (e.g., the electronic device 104), may allow the respective users 102 to navigate to the various user interfaces described herein, to interact with or access services, such as a payment service 108. In some examples, the respective users 102 can interact with the user interfaces to, among other things, facilitate transactions (e.g., electronic payments) with other users, order a payment instrument 110, redeem incentives, or the like. In some examples, the payment application 106 allows two users who are "peers" to transfer funds in a "peer-to-peer (P2P)" transaction. In some examples, the payment application 106 allows a merchant and a customer of the merchant to transfer funds between each other, such as when the customer is purchasing an item(s) from the merchant. In some examples, the payment application 106 installed on respective electronic devices (e.g., the electronic device 104) can be different instances of a same payment application 106, which can be provided by a payment service computing platform that implements the payment service 108. For example, the users 102 may download and install a particular version of the payment application 106 on their electronic devices (e.g., the electronic device 104), either via a first time installation, a software update, or the like.

As depicted by FIG. 1, the electronic device 104 of the user 102(1) may be coupled to one or more servers 112 of the payment service computing platform via one or more network(s) 114, such as a wide area network (WAN) (e.g., the Internet, a cellular network, etc.). Other electronic devices of other users 102 may be coupled to the server(s) 112 in a similar fashion. In some examples, the payment service computing platform may include a cloud-based computing architecture suitable for hosting and servicing the respective payment applications (e.g., the payment application 106) executing on the respective electronic devices (e.g., the electronic device 104). In particular examples, the payment service computing platform may include a Platform as a Service (PaaS) architecture, a Software as a Service (SaaS) architecture, an Infrastructure as a Service (IaaS) architecture, a Data as a Service (DaaS) architecture, a Compute as a Service (CaaS) architecture, or other similar cloud-based computing architecture (e.g., "X" as a Service (XaaS)). The payment service computing platform may be used to implement the aforementioned payment service 108, as described herein.

A service provider may operate the payment service computing platform, which may include one or more processing devices, such as the aforementioned server(s) 112, and one or more data stores 116. The server(s) 112 (or other types of processing devices) may be configured to provide processing or computing support for the respective payment applications (e.g., the payment application 106) executing on the respective electronic devices (e.g., the electronic device 104). The data store(s) 116 may include, for example, one or more internal data stores that may be utilized to store user data 118 (e.g., user transaction history data, user purchase history data, user interaction data, user attribute data, user demographic data, user contextual data, user preference data, and so forth) associated with the respective users 102. The user data 118 can be organized by user identifiers (IDs) that uniquely identify each user 102 of the payment service 108. The user data 118 can be collected by the payment service computing platform at any suitable time, such as when new users 102 are onboarded to the payment service 108, and/or as many of those users 102 continue to use the payment service 108 to, among other things, complete transactions using the payment application 106 executing on their electronic devices (e.g., the electronic device 104) and/or using the payment instrument 110. Over time, one can appreciate that a large collection of historical user data 118 tied to registered user accounts may be available to the payment service computing platform.

In some examples, the data store(s) 116 may be utilized to store incentive data 120 associated with incentives, which are made available to the users 102 by the payment service 108. Incentives may be provided to at least some of the users 102 for performance of an action(s) or to incentivize performance of an action(s). For example, non-card-holding users 102 may be offered sign-on incentives in exchange for ordering the payment instrument 110. As another example, card-holding users may be offered engagement incentives in exchange for using the payment instrument 110. In some examples, an incentive incentivizes a user 102 to change their level of engagement with the payment application 106, with the payment service 108, and/or with the payment instrument 110. The incentive data 120 can be organized by incentive IDs that uniquely identify each incentive. The incentive data 120 may include, for an individual incentive, one or more attributes, such as an amount of a discount, an amount of fiat currency (e.g., a dollar amount), stock, cryptocurrency, or other asset, an offer frequency, a time period for which the incentive is active, a merchant associated with the incentive, a type of the incentive (e.g., reward type), or the like. In some examples, the incentives may include loyalty incentives that are provided to users 102 in exchange for the users 102 achieving a certain level of usage of the payment service 108, such as keeping the payment application 106 installed on an electronic device 104 for a certain amount of time, completing an above-threshold number of transactions over a prescribed time period using the payment application 106, or the like. Another example of an incentive is a discount (e.g., a coupon, a rebate, etc.) that is provided to users 102 to incentivize the users 102 to use the payment service 108. Furthermore, the incentives can be, or include, any suitable type of incentive including, without limitation, a fiat currency (e.g., a dollar amount), a gift (e.g., a gift card, a non-fungible token (NFT), etc.), a coupon, a discount, loyalty points, a status, a stock, a bond, a mutual fund, an exchange-traded fund (ETF), a cryptocurrency, a NFT, a purchase (e.g., of stock, cryptocurrency, NFT, etc.), or the like. In an example, an incentive may be associated with a dollar amount in United States fiat currency (e.g., $5, $10, $15, $20, $25, $30, etc.). It is to be appreciated that incentives can be associated with decimal amounts, such as $22.50. In some examples, an incentive may be determined as a percentage discount applied to a transaction (e.g., 5% off, 10% off, 15% off, % 20% off, etc.). Although the incentives are often described herein by way of example as a fiat currency (particularly a United States dollar amount) or a discount percentage, it is to be appreciated that the incentives described herein can take any other suitable form besides fiat currency or a discount percentage. In some examples, incentives can be based on aspects of associated transactions, for instance, a total amount, an item purchased, or a merchant. For example, a "cash back" incentive can be based on a total amount spent or a stock incentive can be based on an item or a merchant.

In some examples, the payment service computing platform (e.g., the server(s) 112 and/or the data store(s) 116) may be a hosting and servicing platform for the respective payment applications (e.g., the payment application 106) executing on respective electronic devices (e.g., the electronic device 104) of the users 102. As depicted by FIG. 1, the payment application 106 may include, for example, a user interface(s) 126 for displaying, among other data, incentives 128, and/or information associated with the incentives 128. In some examples, the payment service computing platform may be configured to optimize the presentation of data (e.g., the incentives 128) using one or more AI models 130. In the example of FIG. 1, the payment service 108 is shown as including a metric component 132, an incentive component 134, and an optimization component 136. These components, and the payment service 108 itself, may represent computer-executable instructions that, when executed by a processor(s) (e.g., a processor(s) of the server(s) 112) cause performance of one or more operations described herein. In some examples, one or more of these components may utilize one or more of the AI models 130 to perform their respective tasks.

The metric component 132, for example, may use a trained AI model(s) 130 to determine a value associated with the user 102(1) in FIG. 1, as well as one or more additional values associated with one or more other users 102(2) to 102(N). The value associated with an individual user 102 represents a predicted engagement metric indicating a change in a level of engagement if the user 102 is offered an incentive 128 having a particular attribute(s). By determining respective values across multiple unique pairings of users 102 and incentives 128, the metric component 132 can determine multiple values representing multiple predicted engagement metrics indicative of the respective likelihoods of the users 102 changing their level of engagement (e.g., with the payment application 106, with the payment service 108, with the payment instrument 110, etc.) in response to the presentation of the data (e.g., the incentives 128) on electronic devices (e.g., the electronic device 104) of those users 102. In some examples, the AI models 130 described herein can be, or include, machine learning models. Machine learning generally involves processing a set of examples (called "training data" or a "training dataset") in order to train a machine learning model(s). Example techniques for training the AI model(s) 130 (e.g., machine learning model(s)) described herein is discussed in more detail below with respect to FIG. 4. A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the metric component 132, the unknown input provided by the metric component 132 to the trained AI model(s) 130 may be user data 118 (e.g., a user ID) associated with a user 102 (and/or a signal(s) that is/are generated based on the user data 118), and/or incentive data 120 (e.g., an incentive ID) associated with an incentive 128 (and/or a signal(s) that is/are generated based on the incentive data 120). The trained AI model(s) 130 may be tasked with generating (and/or outputting) a predicted engagement metric (e.g., a value, a score, a binary (will engage, will not engage) indication, etc.) associated with an individual user 102, and my iteratively generate predicted engagement metrics in this manner for any number of users 102. The predicted engagement metric associated with an individual user 102 may indicate, or otherwise relate to, a change in a level of engagement if the user 102 is offered the incentive 128.

As mentioned above, the payment service 108 may offer a payment instrument 110 (e.g., a debit card, a credit card, etc.) to users 102 of the payment service 108. Accordingly, some users 102 of the payment service 108 may be "non-card-holding users" who have been onboarded to the payment service 108 but have not ordered the payment instrument 110, and other users 102 of the payment service 108 may be "card-holding users" who have ordered the payment instrument 110 at some point after being onboarded to the payment service 108. Once a user 102 becomes a card-holding user 102, they can use the payment instrument 110 to conduct transactions (e.g., to purchase items online or at POS). In this context, the predicted engagement metric that is generated by the trained AI model(s) 130 may indicate the change in the level of engagement as a likelihood of a non-card-holding user 102 ordering (and/or starting to use) the payment instrument 110 if the non-card-holding user 102 is offered an incentive 128 having a particular attribute(s). In this example, the trained AI model(s) 130 may be, or include, a propensity model that is configured to forecast the propensity of the non-card-holding user 102 ordering (or not ordering) the payment instrument 110. The incentive 128 that is evaluated in this example may be a sign-on incentive that incentivizes non-card-holding users 102 to order the payment instrument 110, or any other suitable type of incentive described herein. In this example, a value representing the predicted engagement metric may be a variable that is normalized in the range of [0,1], wherein a value of zero corresponds to a 0% likelihood of the non-card-holding user 102 ordering the payment instrument 110, and wherein a value of one corresponds to a 100% likelihood of the non-card-holding user 102 ordering the payment instrument 110. In some examples, the trained AI model(s) 130 may generate a set of probabilities (e.g., two probabilities), or metrics relating thereto, where one probability (or metric) relates to the probability of the user 102 ordering the payment instrument 110, and the other probability (or metric) relates to the probability of the user 102 not ordering the payment instrument 110. The predicted engagement metric that is generated by the trained AI model(s) 130 can relate to either of these probabilities in order to forecast the propensity of the non-card-holding user 102 ordering (or not ordering) the payment instrument 110. In some examples, the trained AI model(s) 130 may be configured to generate a confidence metric (e.g., a confidence value, a confidence score, etc.) associated with the primary output value (e.g., predicted engagement metric) in order to indicate a confidence level of the primary prediction being accurate.

In some examples, the predicted engagement metric that is generated by the trained AI model(s) 130 may indicate the change in the level of engagement as a predicted level of engagement of an individual user 102 (e.g., a card-holding user or a non-card-holding user) with the payment application 106, with the payment service 108, and/or with the payment instrument 110 if the individual user 102 is offered an incentive 128 having a particular attribute(s). The incentive 128 that is evaluated in this example can be the above-mentioned sign-on incentive, or an engagement incentive that incentivizes users 102 to remain engaged with the payment application 106, with the payment service 108, and/or with the payment instrument 110, or any other suitable type of incentive described herein. In this example, the value representing the predicted engagement metric may indicate an amount of fiat currency (e.g., a dollar amount) the individual user 102 is predicted to spend over a period of time using the payment application 106, the payment service 108, and/or the payment instrument 110. For example, the trained AI model(s) 130 may generate a value of $200 for a given user 102, which may indicate that the user 102 is predicted to spend $200 over a prescribed time period (e.g., three months) using the payment instrument 110. As another example, the value representing the predicted engagement metric may indicate a predicted gross profit attributable to the user 102, a predicted return on investment (ROI) attributable to the user 102, or a predicted number of interactions within the payment app 106 (e.g., with other users, merchants, etc.) attributable to the user 102. As yet another example, the value representing the predicted engagement metric may indicate a predicted stored balance 122, a predicted savings balance, a predicted spend (e.g., daily, monthly, annually), a predicted number of referrals, a predicted number of services, or the like associated with the user 102.

In some examples, the predicted engagement metric that is generated by the trained AI model(s) 130 may indicate the change in the level of engagement as a predicted amount of the change in the level of engagement, relative to a baseline level of engagement, of an individual user 102 (e.g., a card-holding user or a non-card-holding user) with the payment application 106, with the payment service 108, and/or with the payment instrument 110 if the individual user 102 is offered an incentive 128 having a particular attribute(s). The incentive 128 that is evaluated in this example can be the above-mentioned sign-on incentive, or the above-mentioned engagement incentive, or any other suitable type of incentive described herein. In this example, the value representing the predicted engagement metric may indicate a predicted amount by which the fiat currency a user 102 spends over a period of time using the payment application 106, the payment service 108, and/or the payment instrument 110 will change (e.g., increase, decrease, etc.) relative to a baseline amount. For example, the trained AI model(s) 130 may generate a value of $100, which may indicate that the user 102 is predicted increase their spend by $100 over a period of three months using the payment instrument 110. In this example, if the baseline spend amount for the user 102 is $100 per quarter, and the trained AI model(s) 130 may predict that the user 102 will increase their spend to $200 over the next quarter if the user 102 is offered the incentive 128 having the particular attribute(s), which is an increase of $100 relative to the baseline spend of $100 for the user 102. As another example, the value representing the predicted engagement metric may indicate a predicted amount of change in gross profit attributable to the user 102 relative to a baseline gross profit, a predicted amount of change in ROI attributable to the user 102 relative to a baseline ROI, or a predicted amount of change in a number of interactions within the payment application 106 attributable to the user 102 relative to a baseline number of interactions within the payment application 106. As yet another example, the value representing the predicted engagement metric may indicate a predicted amount of change in a stored balance 122 associated with the individual user 102 relative to a baseline stored balance 122.

In general, the metric component 132 is configured to use the trained AI model(s) 130 to classify the users 102 of the payment service 108 based on their predicted level of engagement if the users 102 are offered incentives 128 having particular attributes. The metric component 132 can execute the trained AI model(s) 130 to classify users 102 at any suitable time, such as in response to an event, periodically at any suitable frequency (e.g., daily, weekly, bi-weekly, etc.). In some examples, the metric component 132 uses the trained AI model(s) 130 to evaluate existing incentives that are currently being made available to the users 102 of the payment service 108. That is, a set of existing incentives 128 maintained in the data store(s) 116 (e.g., represented by the incentive data 120) can be accessed from the data store(s) 116 and evaluated by the metric component 132 using the trained AI model(s) 130, as described above. In some examples, the metric component 132 uses the trained AI model(s) 130 to evaluate "hypothetical" incentives 128 that are not included in the set of existing incentives 128 at the time of the evaluation. In these examples, the incentive component 134 may be configured generate an incentive 128 for evaluation by the trained AI model(s) 130 prior to the incentive 128 being added to the set of existing incentives 128 maintained the data store(s) 116. In other words, in some examples, prior to generating the incentive 128 having a particular attribute(s) for evaluation by the trained AI model(s) 130, the set of existing incentives 128 maintained in the data store(s) 116 did not include the incentive 128. In some examples, the incentive component 134 is configured to dynamically determine one or more incentive attributes for evaluation by the trained AI model(s) 130. In some examples, the incentive attribute(s) is dynamically determined based at least in part on the user data 118. As used herein, "dynamically determining" or "dynamically generating" an incentive 128 and/or an attribute(s) thereof means using an automated process (e.g., AI, machine learning, etc.) to determine or generate the incentive 128 and/or the incentive attribute(s) without user intervention, and in real-time or near real-time. In some examples, the incentive component 134 may be configured to dynamically determine an incentive 128 associated with an individual user 102 based at least in part on the predicted engagement metric associated with that user 102 (for example, as determined by the metric component 132 and using a trained AI model(s) 130).

In some examples, the incentive component 134 itself uses a trained AI model(s) 130 to generate an incentive 128 and/or an attribute(s) thereof. For example, the unknown input to a trained AI model(s) 130 used to generate an incentive 128 may be the predicted engagement metric associated with the user 102, and/or a signal(s) that is/are generated based on the predicted engagement metric. The trained AI model(s) 130, in this example, may be tasked with generating an incentive 128 having one or more particular attributes (e.g., based on the relevance of the attribute(s) to a user 102). Such incentive attributes may include an amount of a discount, an amount of fiat currency (e.g., a dollar amount), stock, cryptocurrency, or other asset, an offer frequency, a time period for which the incentive 128 is active, a merchant associated with the incentive, a type of the incentive (e.g., reward type), or the like. For example, the incentive component 134 may use a trained AI model(s) 130 to generate a merchant-specific incentive 128 that is predicted to increase the likelihood that a particular user 102 will order (and/or start using) the payment instrument 110, and/or maximize the engagement of the particular user 102 with the payment application 106, with the payment service 108, and/or with the payment instrument 110. As another example, the incentive component 134 may use a trained AI model(s) 130 to generate incentives 128 associated with a specific amount of a discount, a specific amount of fiat currency (e.g., dollar amount), a specific stock, cryptocurrency, or other asset, a specific offer frequency, or the like, based on the user data 118 associated with a particular user 102. As yet another example, the incentive component 134 may use a trained AI model(s) 130 to generate fiat currency incentives 128, cryptocurrency incentives 128, stock incentives, or the like, based on the user data 118 associated with a particular user 102. In the various examples described above, an incentive 128 (and/or the attribute(s) thereof) can be dynamically determined (e.g., generated) on-on-the fly, even though the incentive 128 is not already included in the set of existing incentives 128 that are currently made available to the users 102 of the payment service 108.

The AI model(s) 130 (e.g., machine learning model(s)) used by the techniques and systems described herein may represent a single model or an ensemble of base-level AI models, and may be implemented as any type of AI model. For example, suitable AI models 130 for use by the techniques and systems described herein include, without limitation, neural networks (e.g., generative adversarial networks (GANs), deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of AI models 130 whose outputs (predictions) are combined, such as by using weighted averaging or voting. The individual AI models of an ensemble can differ in their expertise, and the ensemble can operate as a committee of individual AI models that is collectively "smarter" than any individual AI model of the ensemble.

The optimization component 136 may be configured to use an optimization framework, algorithm, formulae, or the like to identify, based at least in part on the values (representing the predicted engagement metrics) associated with the evaluated users 102(1) to 102(N), a subset 138 of the users 102(1) to 102(N). In some examples, the optimization component 136 is configured to rank the users 102(1) to 102(N) in a ranked order based at least in part on the value associated with each of the users 102(1) to 102(N), where the value represents the predicted engagement metric described above. For example, if the value representing the predicted engagement metric indicates an amount of fiat currency (e.g., a dollar amount) an individual user 102 is predicted to spend over a period of time using the payment application 106, the payment service 108, and/or the payment instrument 110, a first value of $200 may be associated with a first user 102, a second value of $300 may be associated with a second user 102, and so on and so forth for any number of users 102. In this example, the optimization component 136 may be configured to rank the second user 102 higher than the first user 102 in a ranked list of users 102 because the second user 102 is predicted to spend $100 more than the first user 102 if the users 102 are offered an incentive 128 having a particular attribute(s). This is merely an example, and it is to be appreciated that ranking schemes can be utilized based at least in part on the user-associated values representing the predicted engagement metrics. In some examples, the optimization component 136 may utilize a trained AI model(s) 130 to generate a ranked list of users 102(1) to 102(N). For example, the optimization component 136 may provide the user-associated values representing the predicted engagement metrics (and/or a signal(s) that is/are generated based on the metrics) as input to a trained AI model(s) 130, and the model(s) 130 may be tasked with generating a ranked list (e.g., a N-best list) of the users 102(1) to 102(N).

In some examples, the identified subset 138 of the users 102 is selected from a ranked list of the users 102(1) to 102(N). For example, the identified subset 138 may represent the users 102 that are ranked highest in a ranked list of the users 102(1) to 102(N) (e.g., the top hundred users 102, the top thousand users 102, etc.). In some examples, a number of the users 102 in the identified subset 138 can be dynamically determined based at least in part on a cost of offering the incentive(s) 128 and a fixed budget. For example, an incentive campaign may be constrained to a fixed budget to cover the cost of offering incentives 128 to the users 102 of the payment service 108. For example, if a user 102 redeems an incentive 128 that is valued at $10, the $10 is subtracted from the fixed budget. Thus, the value of an incentive 128 multiplied by the number of users 102 who are offered and/or who redeem the incentive 128 can be considered a cost of offering the incentive 128. Accounting for this fixed budget and the cost of offering incentives 128, the identified subset 138 may include a number of users 102 that, if offered incentives 128, will not exceed the fixed budget for the incentive campaign.

In some examples, an optimization framework used by the optimization component 136 for the presentation of data can include the following inputs: (i) a cash-funded incentive budget: B; (ii) a predicted incentive usage probability for user i and incentive j: $P_{ij}$; (iii) an incentive attach value measure by an objective metric: $M_{ij}$; and (iv) a cost associated with user i using incentive j: $C_{ij}$. In examples where the incentives 128 are provided as discount percentages, $C_{ij}$ can represent the mean cost from a set of users 102 who have used incentive j in the past. For each combination of user

102 and incentive 128, an expected incremental value of usage may be determined from Equation (1), below:

$$E_{ij}=M_{ij}P_{ij} \tag{1}$$

In some examples, a ROI from offering each incentive 128 can be calculated using Equation (2), below:

$$E_{ij}|C_{ij}P_{ij}=M_{ij}/C_{ij} \tag{2}$$

Within a finite budget, the optimization component 136 may rank $C_{ij}$ from high-to-low (e.g., from the highest ROI to the lowest ROI) and select all the possible combinations of incentive j and user i that satisfies Equation (3), below:

$$\Sigma(C_{ij})<B \tag{3}$$

Accordingly, in some examples, a greedy algorithm can be used to present a maximum number of incentives 128 to the identified subset 138 of the users 102(1) to 102(N) within a fixed budget, B, for an incentive campaign, whereby the predicted user engagement is maximized for every dollar spent offering incentives 128 to users 102. This is one example of how such an optimization determination can be made.

FIG. 1 illustrates an example where the user 102(1) is one of the users 102 within the identified subset 138, and, hence, data (e.g., one or more incentives 128) is presented to the user 102. In this example, the payment service computing platform may cause an incentive(s) 128 to be presented via a user interface 126 of the payment application 106 executing on the device 104 of the user 102. In the example of FIG. 1, multiple incentives 128(1), 128(2), 128(3), and 128(4) are presented via the user interface 126. In some examples, the incentive component 134 may have generated one or more of these incentives 128(1) to 128(4), such as the incentive 128(1), which is indicated on the user interface 126 as a "new" incentive 128(1). By allocating computing resources for presenting data (e.g., incentives 128) to users 102 within the identified subset 138, thereby refraining from utilizing computing resources that would otherwise have been used to present data (e.g., incentives 128) to users 102 who are not within the identified subset 138, computing resource utilization is optimized with the techniques described herein.

In some examples, the techniques, devices, and systems described herein allow for one or more devices to conserve resources with respect to processing resources, memory resources, networking resources, power resources, etc., in the various ways described herein. For example, presenting data to users who do not change their behavior in response to the presentation of data is a waste of computing resources that are used for presenting the data to those users. The techniques, devices, and systems described herein conserve computing resources by optimizing the way that those computing resources are utilized or otherwise allocated for presenting data (e.g., an incentive(s) 128) on user devices (e.g., the device 104). For example, by utilizing resources for presenting data to users 102 who are most likely to change (e.g., increase, decrease, etc.) their level of engagement (e.g., with the payment application 106, with the payment service 108, and/or with the payment instrument 110) and/or engage more or less than other users 102 if presented with particular data (e.g., incentive(s) 128 having a particular attribute(s)), computing resource utilization is optimized by refraining from utilizing computing resources that would otherwise have been used to present data to users 102 who are far less likely to change (e.g., increase, decrease, etc.) their level of engagement and/or engage less or more than other users 102 if presented with the same data (e.g., incentive(s) 128).

Example user interfaces will now be described with reference to FIGS. 2A-2B.

Figures 2A, 2B:
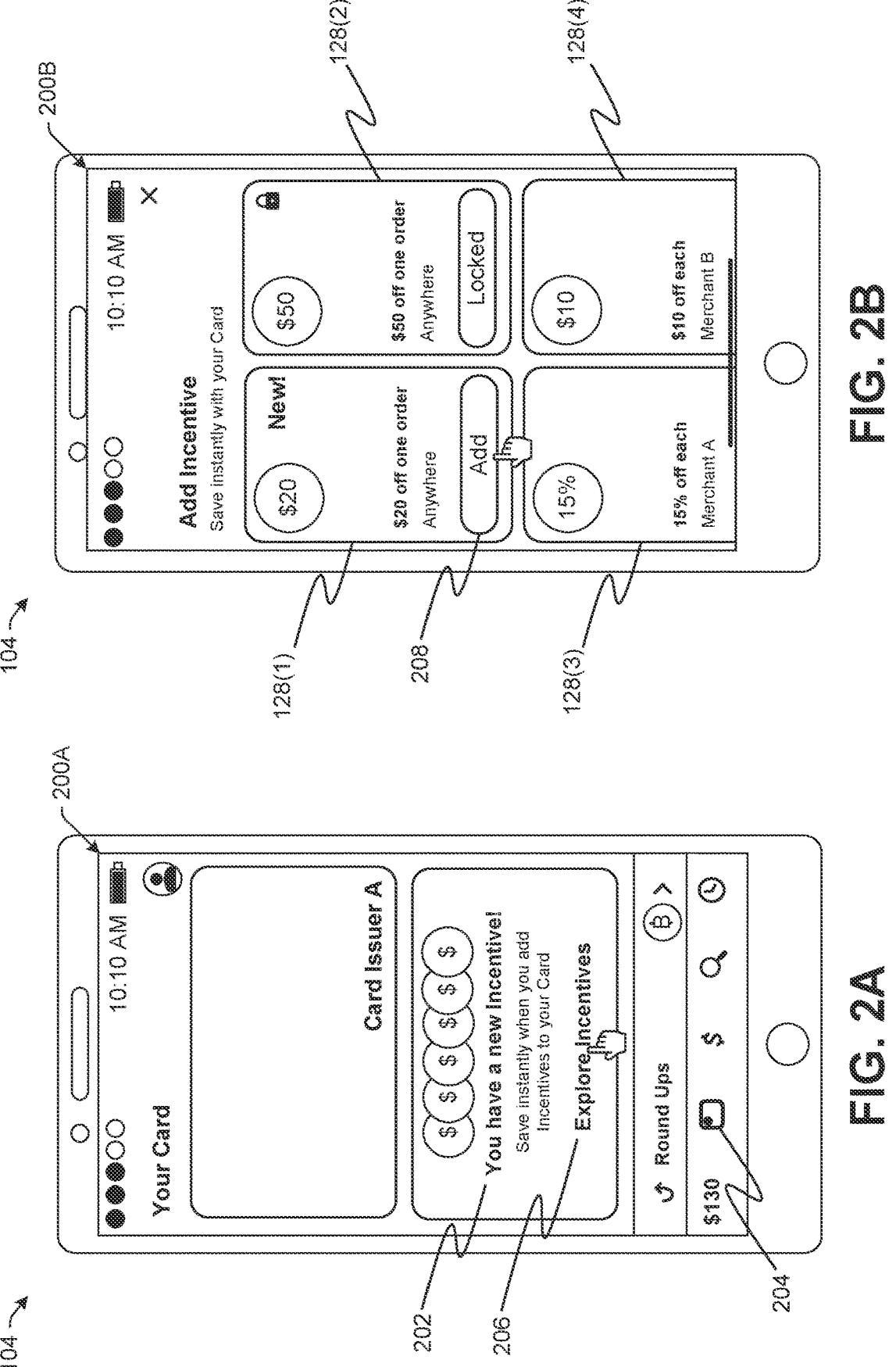
FIG. 2A is an example user interface of a payment application, the user interface presenting a notification message, according to an implementation of the present subject matter.
FIG. 2B is another example user interface of the payment application, the user interface presenting incentives for selection, according to an implementation of the present subject matter.

FIG. 2A is an example user interface 200A of a payment application 106, the user interface 200A presenting a notification message 202, according to an implementation of the present subject matter. The user interface 200A may be displayed via the payment application 106 executing on an electronic device 104 of a user 102, such as the user 102(1) of FIG. 1. The user interface 200A may be displayed at any suitable time. For example, the user interface 200A may be displayed in response to the user 102 opening the payment application 106 and interacting with (e.g., selecting) an interactive element 204, which may be associated with viewing information about the payment instrument 110, which is offered by a service provider of the payment service 108, as described above. In the example of FIG. 2A, the notification message 202 says "You have a new Incentive!" This is merely an example notification message 202, and it is to be appreciated that any suitable message 202 notifying the user 102 about an availability of an incentive 128 may be output (e.g., presented) via the payment application 106. In some examples, the notification message 202 is sent by the payment service computing platform over the network(s) 114 to the electronic device 104 for presentation of the notification message 202 via the payment application 106. In some examples, prior to the user 102 opening the payment application 106 on the electronic device 104, the notification message 202 may be output as a pop-up notification and/or a banner notification on the electronic device 104, and/or an audible sound and/or vibration may be output via the electronic device 104 as part of the notification message 202. After opening the payment application 106, the user 102 may thereafter see the notification message 202 presented within the user interface 200A, such as in response to interacting with (e.g., selecting) the interactive element 204. In some examples, the notification message 202 is sent in response to the optimization component 136 identifying the subset 138 of the users 102. In other words, the electronic device 104 shown in FIG. 2A may belong to a user 102 in the identified subset 138 described above, which may be a reason why the user 102 received the notification message 202. The user interface 200A may further present an interactive element 206 that, when interacted with (e.g., selected), causes the user interface 200B of FIG. 2B to be displayed on the electronic device 104. In the example of FIG. 2A, the interactive element 206 is an "Explore Incentives" element, which indicates to the user 102 that an interaction with (e.g., selection of) the interactive element 206 will allow the user 102 to browse incentives 128 available to the user 102, including the new incentive 128 relating to the notification message 202.

FIG. 2B is another example user interface 200B of the payment application 106, the user interface 200B presenting incentives 128 for selection, according to an implementation of the present subject matter. The user interface 200B (which may represent a more detailed version of the user interface 126 introduced in FIG. 1) may be displayed via the payment application 106 at any suitable time. For example, the user interface 200B may be displayed in response to the user 102 interacting with (e.g., selecting) the interactive element 206 of the user interface 200A, which, as described above, may be associated with browsing incentives 128 available to the user 102. In the example of FIG. 2B, the new incentive 128(1) relates to the notification message 202 described above with reference to FIG. 2A. This incentive 128(1) may have been generated by the incentive component 134 as a newly generated incentive or selected from the set of existing incentives 128 maintained in the data store(s) 116. The incentives 128(1) to 128(4) may have one or more attributes. In the example of FIG. 2B, one example attribute of the incentive 128(1) is a discount amount of $20. The incentive 128(1) may have other attributes as well, such as a merchant attribute of "Anywhere," meaning that the incentive 128(1) can be redeemed at any suitable merchant and is not specific to any particular merchant. Other attributes of the incentive 128(1) may include an offer frequency, a time period for which the incentive 128(1) is active, a type of the incentive 128(1) (e.g., a discount on a future transaction), or the like. The other incentives 128(2) to 128(4) may have similar attributes. It is to be appreciated that different incentives 128 may have one or more different attributes, while, in some cases, different incentives 128 can have attributes in common. This is the case with the incentives 128(1) and 128(2), which have the same merchant attribute of "Anywhere," yet the respective discount amounts of the incentives 128(1) and 128(2) differ; one having a discount amount of $20, and the other having a discount amount of $50.

In some examples, one or more of the incentives 128 may be associated with an inactive state when presented via the user interface 200B. As an example, the incentive 128(1) may be associated with an inactive state, as indicated by the interactive element 208 (e.g., an "Add" button). In this example, the user 102 may provide an input (e.g., touch input) to the electronic device 104 to interact with (e.g., select) the interactive element 208. The payment application 106 and/or the payment service computing platform (e.g., the server(s) 112) may receive an indication of such an input indicating a selection of the incentive 128(1). Based at least in part on receiving the indication of the input (e.g., based on the user's 102 interaction with the interactive element 208), the payment application 106 and/or the payment service computing platform may activate the incentive 128(1) to an active state, wherein the active state causes the incentive 128(1) to be conditionally redeemable. In the example of FIG. 2B, the interaction with the interactive element 208 may activate the incentive 128(1) such that the activated incentive 128(1) is conditionally redeemable in association with a future transaction for which payment is made using the payment instrument 110. In some examples, activation of the incentive 128(1) to an active state may cause the incentive 128(1) to be conditionally redeemable in association with a future transaction with a particular merchant. In some examples, activation of the incentive 128(1) to an active state may cause the incentive 128(1) to be conditionally redeemable for a limited period of time and/or at a particular location (e.g., within a particular geographical area).

In some examples, the incentives 128(1) to 128(4) that are presented via the user interface 200B may be personalized and/or customized to the particular user 102 of the electronic device 104 in one or more ways. For example, the payment service computing platform may dynamically determine a merchant(s) preferred by the user 102 based at least in part on the user data 118 associated with the user 102, and the presented incentives 128(1) to 128(4) may be personalized and/or customized based on the determined merchant(s). For example, the incentive 128(3) may be generated to have, or may otherwise be selected from the set of existing incentives 128 based on having, a merchant attribute of "Merchant A" if it is determined that the user prefers Merchant A (e.g., based on user transaction history data associated with Merchant A, user purchase history data associated with Merchant A, user interaction data associated with Merchant A, etc.). In some examples, personalization and/or customization of the presented incentives 128(1) to 128(4) may be in the form of ranking the incentives 128(1) to 128(4) and presenting the incentives 128(1) to 128(4) in a ranked order that is personalized and/or customized for the user 102. In the example of FIG. 2B, it may be determined, from historical user data 118 associated with the user 102 of the electronic device 104, that the user 102 prefers incentives 128 that can be redeemed anywhere, and are not specific to any particular merchant, which may be why the incentives 128(1) and 128(2) are presented at the top of the user interface 200B when the user 102 navigates to the user interface 200B. In some examples, the incentives 128 can be generated and/or presented via the user interface 200B according to their relevance to the location of the user 102, the age of the user 102, or the like. In some examples, incentives 128 associated with merchant names that are semantically similar to the name(s) of a merchant(s) preferred by the user 102 are presented in favor of other incentives 128 associated with other merchants. In some examples, incentives 128 of a particular category or type are presented to a user 102 based on the user data 118 associated with the user 102 indicating interactions between the user 102 and particular types or categories of incentives 128 (e.g., discounts on transactions made using the payment application 106 and/or the payment instrument 110, gift cards, preferential terms of a buy now pay later loan, etc.). In some examples, the incentives 128 presented via the user interface 200B may be time-specific in that the incentives 128 are presented based at least in part on the time of day, day of the week, etc., such as presenting a particular incentive 128 redeemable at a restaurant on a weekend as opposed to a weekday, and/or presenting incentives 128 associated with an event or a holiday within a threshold number of days from the day of the event. One or more of these personalization and/or customization techniques may help to drive further user engagement (e.g., by targeting the right users with the right data (e.g., incentives) at the right times).

In some examples, the incentives 128 can be ranked based at least in part on the data stored in the data store(s) 116. In some examples, AI model(s) 130 can analyze such data in view of a set of one or more incentives 128 to determine a ranking, for example, based on relevance to a particular user 102, characteristic of a user 102 (e.g., age, location, etc.), or the like. In some examples the set of one or more incentives 128 can be input into a generative AI model, such as a LLM, with a prompt to rank the set of one or more incentives 128 based on information known about a user 102 or characteristic(s) of a user 102. In some examples, the LLM can be an internal LLM (e.g., an AI model(s) 130 implemented as a LLM), trained on data stored in the data store(s) 116. In some examples, the LLM can be an external LLM 144, trained on a larger corpus of data, and integrated into the payment service computing platform, for example by one or more APIs 146, SDKs, or the like. In some examples, the incentives 128 can be ranked based on an output of the LLM 144, which can be trained using additional or alternative data (e.g., a larger dataset). In some examples, the output of the LLM 144 can be an input into the AI model(s) 130 trained using the data stored in the data store(s) 116 (e.g., internal data). In some examples, the LLM output or the combination of the LLM output and output of the AI model(s) 130 can improve the relevance of the ranking to individual users 102 or users 102 with particular characteristics. This approach can be particularly useful where the user data 118 for a particular user 102 is non-existent or below a threshold (e.g., when the user 102 is onboarding to the payment service 108).

In some examples, the incentives 128 can be ranked using user interaction and/or session-level data. In such examples, user data 118 and/or session-level data can be input into a generative AI model, such as a LLM (internal or external), which can be used to generate an output of user intent. This output can be an explicit understanding or an implicit understanding. Using the output of user intent, the incentives 128 can be ranked or reranked so that incentives 128 relevant to the user's intent are presented prior to those that are less relevant to the user's intent. In some examples, the output of user intent can be an input to the AI model(s) 130.

In some examples, the incentives 128 can be grouped, for example, based on merchant type, incentive amount, incentive type, geolocation, redemption time, etc. In some examples, the AI model(s) 130 can be used to create such groups, for example by taking a set of incentives 128 and creating categories or assigning incentives 128 to categories using category names. In some examples, such grouping can be done using generative AI, such as an LLM (internal or external). That is, the LLM can create categories from sets of incentives 128 and/or assign incentives 128 to categories using category names. In some examples, a prompt can instruct the LLM to group incentives 128 in a particular number, based on a particular characteristic, or the like. In some examples, the AI model(s) 130 can rank the categories using techniques described herein such that categories that are likely to be more relevant to individual users 102 and/or are likely to drive more engagement are presented prior to other categories that are less relevant and/or less likely to drive engagement. In some examples, the optimization component 136 is configured to rank the incentives 128 and/or the categories as described above, and, in some cases, the optimization component 136 can utilize the AI model(s) 130 and/or the external LLM(s) 144 accessible via the API(s) 146, SDK(s), or the like.

In some examples, groups of incentives 128 can be named using the AI model(s) 130. In an example, a set of incentives 128 can be input into a generative AI model, such as an LLM (internal or external), to generate embeddings. From the embeddings, individual incentives 128 of the incentives 128 can be grouped together. Characteristics of the incentives 128 in each group can be input into an LLM with a prompt to create a name for the grouping. The LLM can output one or more names, which can be selected and presented proximate to or as a representation of one or more incentives 128 in the grouping (e.g., on the user interface 200B).

The user interfaces 126, 200A, and 200B are provided as examples of user interfaces that can be presented to facilitate techniques described herein. User interfaces can present additional or alternative data in additional or alternative configurations. That is, user interfaces 126, 200A, and 200B should not be construed as limiting.

Figure 3A:
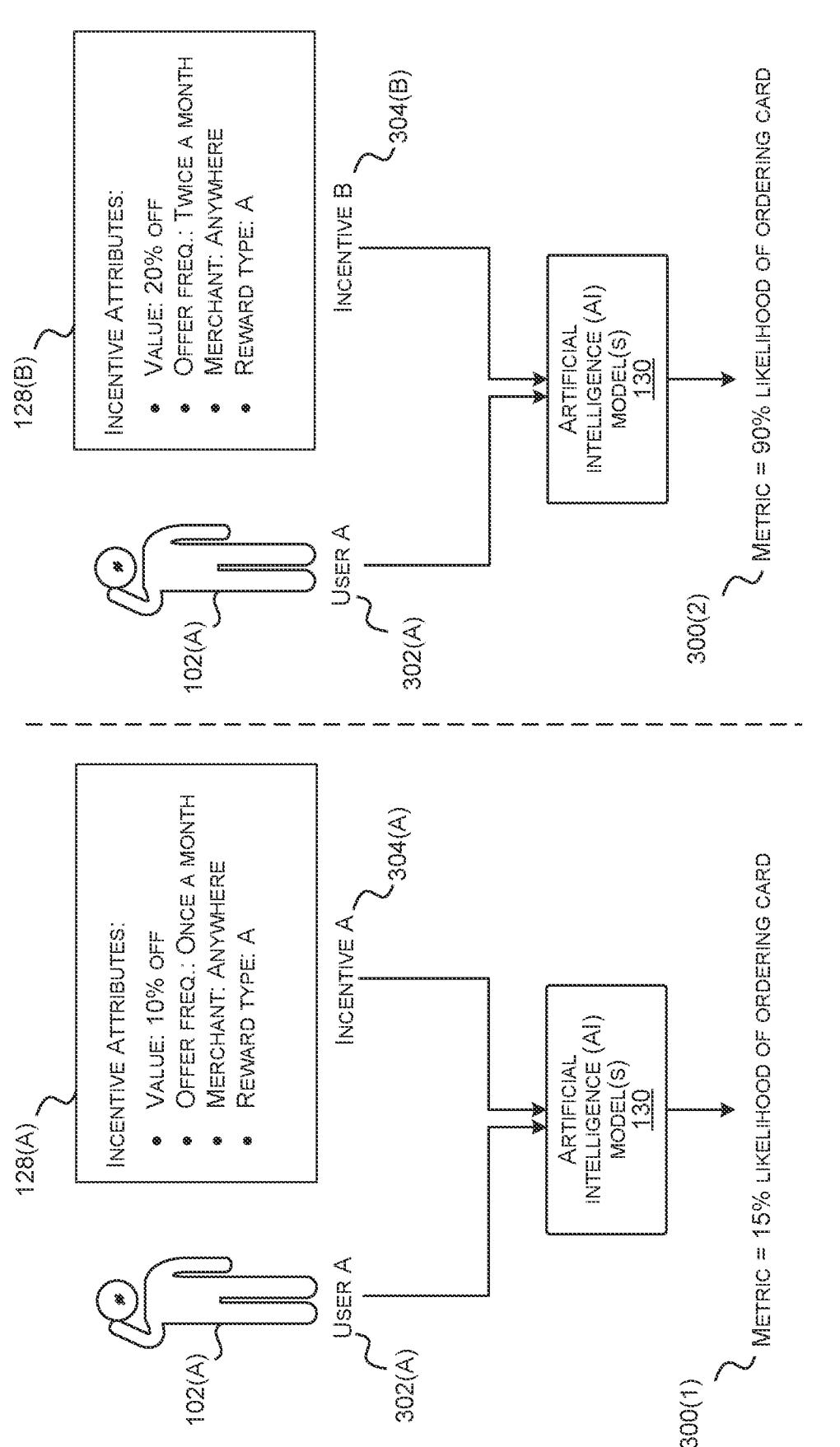
FIG. 3A is an example diagram contrasting metrics that can be generated for the same non-card-holding user if the user is offered different incentives, according to an implementation of the present subject matter.

FIG. 3A is an example diagram contrasting metrics 300 that can be generated for the same non-card-holding user 102(A) if the user 102(A) is offered different incentives 128(A) and 128(B), according to an implementation of the present subject matter. In the example of FIG. 3A, a user 102(A) (e.g., "User A") of the payment service 108 is paired with incentive 128(A) on the left-hand side of the figure, and the user 102(A) is paired with incentive 128(B) on the right-hand side of the figure. As described above, the metric component 132 may use a trained AI model(s) 130 to determine a value associated with the user 102(A), the value representing a predicted engagement metric 300 indicating a change in a level of engagement if the user 102(A) is offered an incentive 128 having a particular attribute(s). As shown on the left-hand side of FIG. 3A, the unknown input provided by the metric component 132 to the trained AI model(s) 130 may be user data 118 (e.g., a user ID 302(A)) associated with a user 102(A) (and/or a signal(s) that is/are generated based on the user data 118), and/or incentive data 120 (e.g., an incentive ID 304(A)) associated with a first incentive 128(A) (and/or a signal(s) that is/are generated based on the incentive data 120). The trained AI model(s) 130 may be tasked with generating (and/or outputting) a predicted engagement metric 300(1) (e.g., a value, a score, a binary (will engage, will not engage) indication, etc.) associated with the user 102(A), which may indicate, or otherwise relate to, a change in a level of engagement if the user 102(A) is offered the incentive 128(A). Here, the predicted engagement metric 300(1) that is generated by the trained AI model(s) 130 indicates the change in the level of engagement as a likelihood of the user 102(A) (e.g., a non-card-holding user) ordering (and/or starting to use) the payment instrument 110 if the user 102(A) is offered the incentive 128(A) having attributes that include a 10% discount, an offer frequency of once a month, a merchant attribute of "Anywhere," and a reward type "A," which may indicate the type of the incentive 128(A) (e.g., a percentage discount on a future purchase using the payment instrument 110). In the example of FIG. 3A, the trained AI model(s) 130 predicts that there is a 15% likelihood of the user 102(A) ordering the payment instrument 110 if the user 102(A) is offered the incentive 128(A).

As shown on the right-hand side of FIG. 3A, the unknown input provided by the metric component 132 to the trained AI model(s) 130 may be user data 118 (e.g., a user ID 302(A)) associated with a user 102(A) (and/or a signal(s) that is/are generated based on the user data 118), and/or incentive data 120 (e.g., an incentive ID 304(B)) associated with a second incentive 128(B) (and/or a signal(s) that is/are generated based on the incentive data 120). The trained AI model(s) 130 may be tasked with generating (and/or outputting) a predicted engagement metric 300(2) (e.g., a value, a score, a binary (will engage, will not engage) indication, etc.) associated with the user 102(A), which may indicate, or otherwise relate to, a change in a level of engagement if the user 102(A) is offered the incentive 128(B), which is different than the incentive 128(A). Here, the predicted engagement metric 300(2) that is generated by the trained AI model(s) 130 indicates the change in the level of engagement as a likelihood of the user 102(A) (e.g., a non-card-holding user) ordering (and/or starting to use) the payment instrument 110 if the user 102(A) is offered the incentive 128(B) having attributes that include a 20% discount, an offer frequency of twice a month, a merchant attribute of "Anywhere," and a reward type "A." In the example of FIG. 3A, the trained AI model(s) 130 predicts that there is a 90% likelihood of the user 102(A) ordering the payment instrument 110 if the user 102(A) is offered the incentive 128(B). Accordingly, contrasting the two pairings of the user 102(A) with different incentives 128(A) and 128(B), as shown in FIG. 3A, the optimization component 136 may determine to present the incentive 128(B) to the user 102(A), but may determine to refrain from presenting the incentive 128(A) to the user 102(A).

Figure 3B:
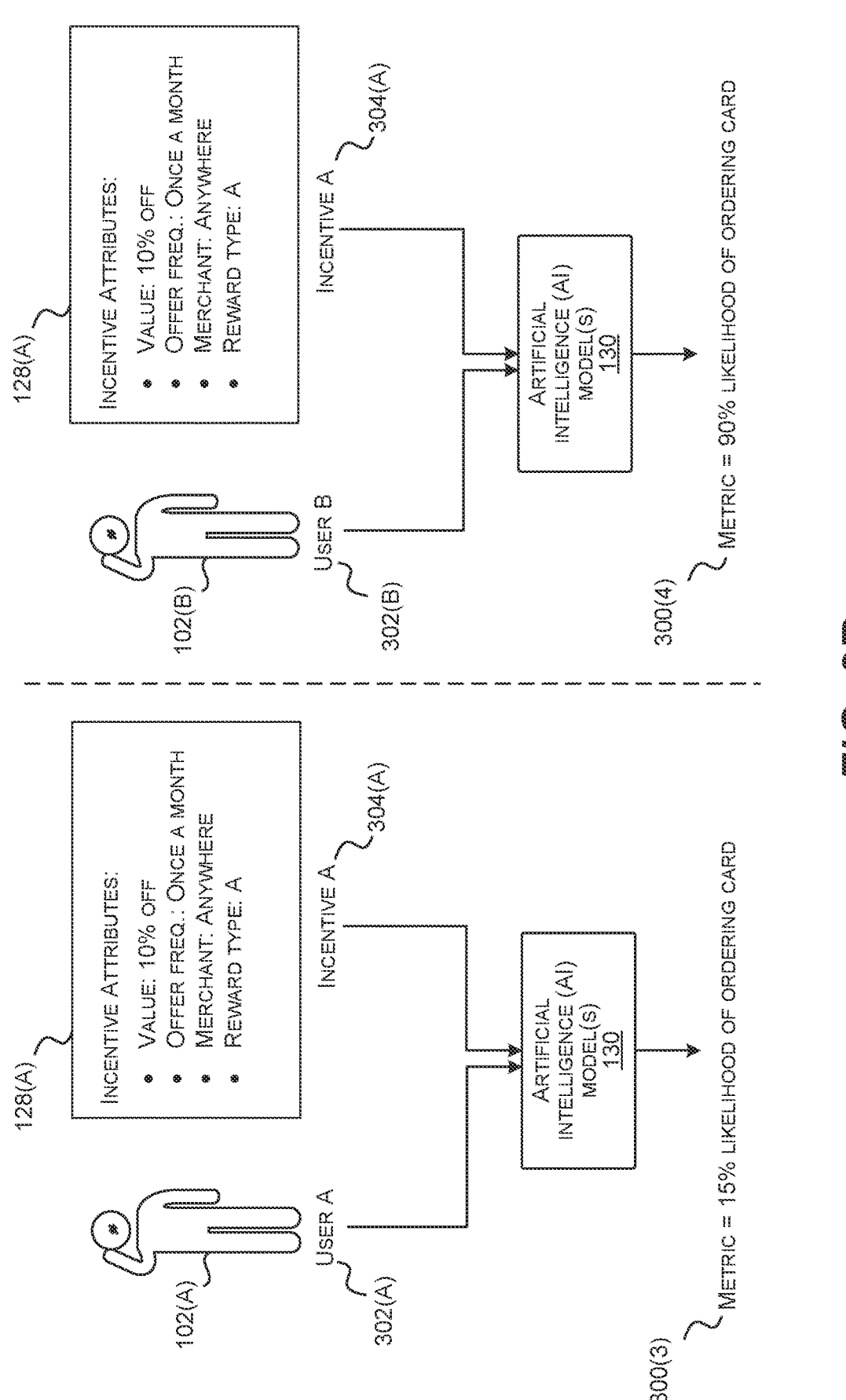
FIG. 3B is an example diagram contrasting metrics that can be generated for different non-card-holding users if they are offered the same incentive, according to an implementation of the present subject matter.

FIG. 3B is an example diagram contrasting metrics 300 that can be generated for different non-card-holding users 102(A) and 102(B) if they are offered the same incentive 102(A), according to an implementation of the present subject matter. In the example of FIG. 3B, a first user 102(A) (e.g., "User A") of the payment service 108 is paired with an incentive 128(A) on the left-hand side of the figure, and a second user 102(B) (e.g., "User B") of the payment service

108 is also paired with the incentive 128(A) on the right-hand side of the figure. As shown on the left-hand side of FIG. 3B, the unknown input provided by the metric component 132 to the trained AI model(s) 130 may be user data 118 (e.g., a user ID 302(A)) associated with a first user 102(A) (and/or a signal(s) that is/are generated based on the user data 118), and/or incentive data 120 (e.g., an incentive ID 304(A)) associated with the incentive 128(A) (and/or a signal(s) that is/are generated based on the incentive data 120). The trained AI model(s) 130 may be tasked with generating (and/or outputting) a predicted engagement metric 300(3) (e.g., a value, a score, a binary (will engage, will not engage) indication, etc.) associated with the first user 102(A), which may indicate, or otherwise relate to, a change in a level of engagement if the first user 102(A) is offered the incentive 128(A). Here, the predicted engagement metric 300(3) that is generated by the trained AI model(s) 130 indicates the change in the level of engagement as a likelihood of the user 102(A) (e.g., a non-card-holding user) ordering (and/or starting to use) the payment instrument 110 if the user 102(A) is offered the incentive 128(A) having attributes that include a 10% discount, an offer frequency of once a month, a merchant attribute of "Anywhere," and a reward type "A." In the example of FIG. 3B (like in FIG. 3A), the trained AI model(s) 130 predicts that there is a 15% likelihood of the user 102(A) ordering the payment instrument 110 if the user 102(A) is offered the incentive 128(A).

As shown on the right-hand side of FIG. 3B, the unknown input provided by the metric component 132 to the trained AI model(s) 130 may be user data 118 (e.g., a user ID 302(B)) associated with a second user 102(B) (and/or a signal(s) that is/are generated based on the user data 118), and/or incentive data 120 (e.g., an incentive ID 304(A)) associated with the incentive 128(A) (and/or a signal(s) that is/are generated based on the incentive data 120). The trained AI model(s) 130 may be tasked with generating (and/or outputting) a predicted engagement metric 300(4) (e.g., a value, a score, a binary (will engage, will not engage) indication, etc.) associated with the second user 102(B), which may indicate, or otherwise relate to, a change in a level of engagement if the user 102(B) is offered the incentive 128(A). Here, the predicted engagement metric 300(4) that is generated by the trained AI model(s) 130 indicates the change in the level of engagement as a likelihood of the second user 102(B) (e.g., a different non-card-holding user) ordering (and/or starting to use) the payment instrument 110 if the user 102(B) is offered the incentive 128(A). In the example of FIG. 3B, the trained AI model(s) 130 predicts that there is a 90% likelihood of the second user 102(B) ordering the payment instrument 110 if the user 102(B) is offered the incentive 128(A). Accordingly, contrasting the two pairings of the different users 102(A) and 102(B) with the same incentive 128(A), as shown in FIG. 3B, the optimization component 136 may determine to present the incentive 128(A) to the second user 102(B), but may determine to refrain from presenting the incentive 128(A) to the first user 102(A).

Figure 3C:
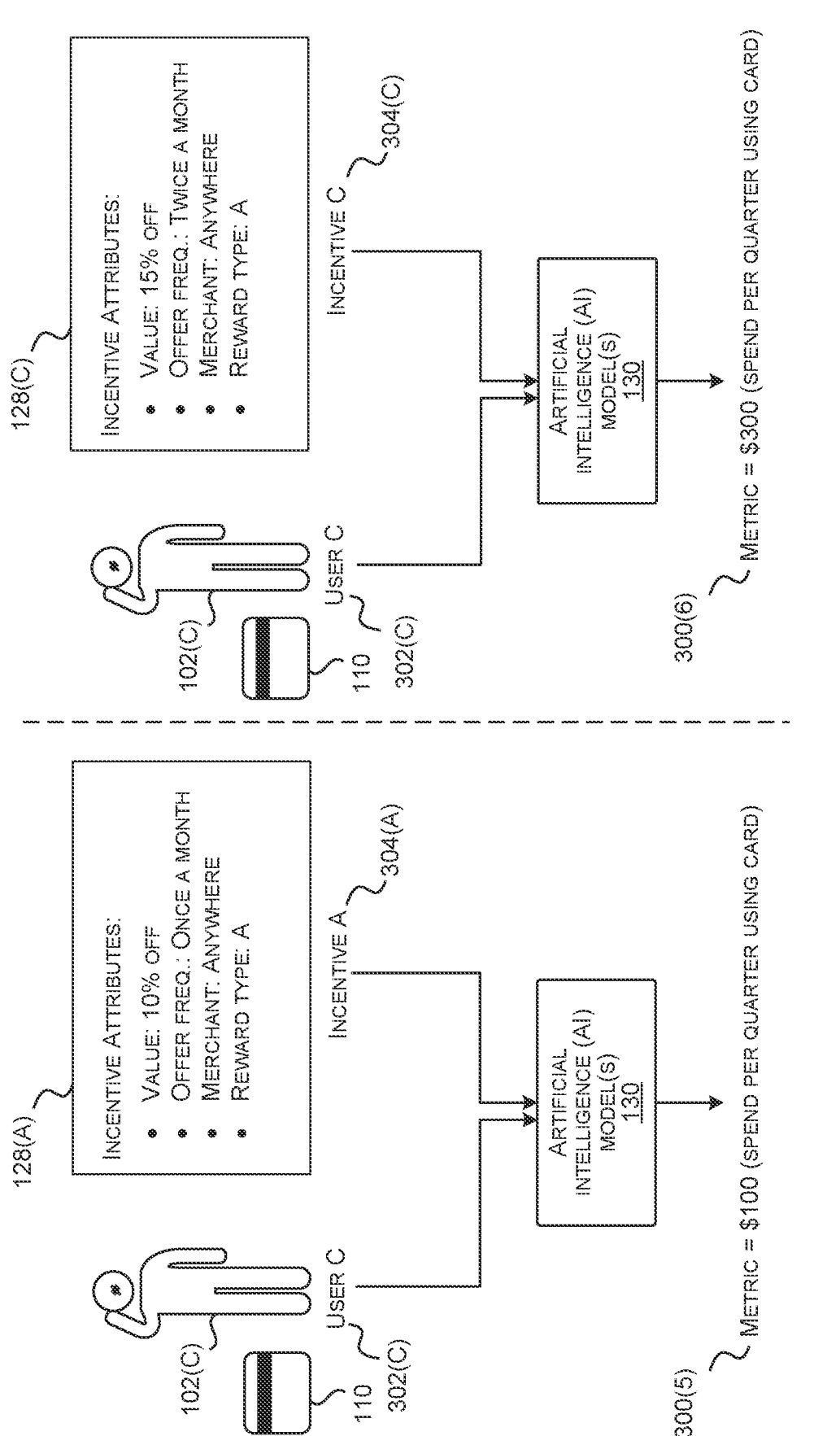
FIG. 3C is an example diagram contrasting metrics that can be generated for the same card-holding user if the user is offered different incentives, according to an implementation of the present subject matter.

FIG. 3C is an example diagram contrasting metrics 300 that can be generated for the same card-holding user 102(C) if the user 102(C) is offered different incentives 128(A) and 128(C), according to an implementation of the present subject matter. In the example of FIG. 3C, a user 102(C) (e.g., "User C") of the payment service 108 is paired with incentive 128(A) on the left-hand side of the figure, and the user 102(C) is paired with incentive 128(B) on the right-hand side of the figure. As shown on the left-hand side of FIG. 3C, the unknown input provided by the metric component 132 to the trained AI model(s) 130 may be user data 118 (e.g., a user ID 302(C)) associated with a user 102(C) (and/or a signal(s) that is/are generated based on the user data 118), and/or incentive data 120 (e.g., an incentive ID 304(A)) associated with a first incentive 128(A) (and/or a signal(s) that is/are generated based on the incentive data 120). The trained AI model(s) 130 may be tasked with generating (and/or outputting) a predicted engagement metric 300 (5) (e.g., a value, a score, a binary (will engage, will not engage) indication, etc.) associated with the user 102(C), which may indicate, or otherwise relate to, a change in a level of engagement if the user 102(C) is offered the incentive 128(A). Here, the predicted engagement metric 300 (5) that is generated by the trained AI model(s) 130 indicates the change in the level of engagement as a predicted level of engagement of the user 102(C) (e.g., a card-holding user) with the payment instrument 110 if the user 102(C) is offered the incentive 128(A) having attributes that include a 10% discount, an offer frequency of once a month, a merchant attribute of "Anywhere," and a reward type "A." In the example of FIG. 3C, the trained AI model(s) 130 predicts that the user 102(C) will spend $100 over a prescribed time period (e.g., three months) using the payment instrument 110 if the user 102(C) is offered the incentive 128(A).

As shown on the right-hand side of FIG. 3C, the unknown input provided by the metric component 132 to the trained AI model(s) 130 may be user data 118 (e.g., a user ID 302(C)) associated with the user 102(C) (and/or a signal(s) that is/are generated based on the user data 118), and/or incentive data 120 (e.g., an incentive ID 304(C)) associated with a second incentive 128(C) (and/or a signal(s) that is/are generated based on the incentive data 120). The trained AI model(s) 130 may be tasked with generating (and/or outputting) a predicted engagement metric 300 (6) (e.g., a value, a score, a binary (will engage, will not engage) indication, etc.) associated with the user 102(C), which may indicate, or otherwise relate to, a change in a level of engagement if the user 102(C) is offered the incentive 128(C), which is different than the incentive 128(A). Here, the predicted engagement metric 300 (6) that is generated by the trained AI model(s) 130 indicates the change in the level of engagement as a predicted level of engagement of the user 102(C) with the payment instrument 110 if the user 102(C) is offered the second incentive 128(C) having attributes that include a 15% discount, an offer frequency of twice a month, a merchant attribute of "Anywhere," and a reward type "A." In the example of FIG. 3C, the trained AI model(s) 130 predicts that the user 102(C) will spend $300 over a prescribed time period (e.g., three months) using the payment instrument 110 if the user 102(C) is offered the incentive 128(C). Accordingly, contrasting the two pairings of the user 102(C) with different incentives 128(A) and 128(C), as shown in FIG. 3C, the optimization component 136 may determine to present the incentive 128(C) to the user 102(C), but may determine to refrain from presenting the incentive 128(A) to the user 102(C).

Figure 3D:
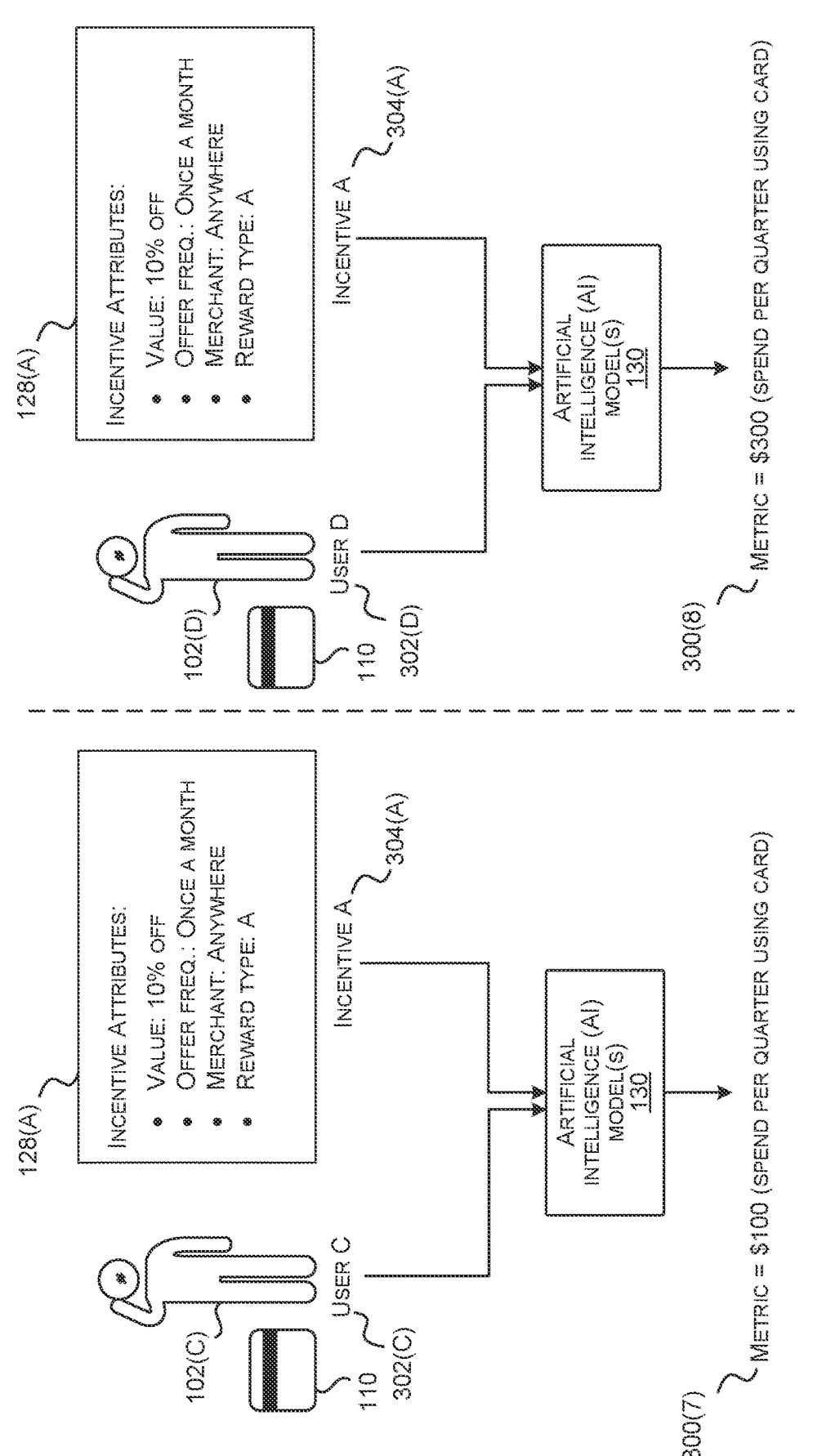
FIG. 3D is an example diagram contrasting metrics that can be generated for different card-holding users if they are offered the same incentive, according to an implementation of the present subject matter.

FIG. 3D is an example diagram contrasting metrics 300 that can be generated for different card-holding users 102(C) and 102(D) if they are offered the same incentive 128(A), according to an implementation of the present subject matter. In the example of FIG. 3D, a first user 102(C) (e.g., "User C") of the payment service 108 is paired with an incentive 128(A) on the left-hand side of the figure, and a second user 102(D) (e.g., "User D") of the payment service 108 is also paired with the incentive 128(A) on the right-hand side of the figure. As shown on the left-hand side of FIG. 3D, the unknown input provided by the metric component 132 to the trained AI model(s) 130 may be user data 118 (e.g., a user ID 302(C)) associated with a first user 102(C) (and/or a signal(s) that is/are generated based on the user data 118), and/or incentive data 120 (e.g., an incentive ID 304(A)) associated with the incentive 128(A) (and/or a signal(s) that is/are generated based on the incentive data 120). The trained AI model(s) 130 may be tasked with generating (and/or outputting) a predicted engagement metric 300 (7) (e.g., a value, a score, a binary (will engage, will not engage) indication, etc.) associated with the first user 102(C), which may indicate, or otherwise relate to, a change in a level of engagement if the first user 102(C) is offered the incentive 128(A). Here, the predicted engagement metric 300 (7) that is generated by the trained AI model(s) 130 indicates the change in the level of engagement as a predicted level of engagement of the user 102(C) (e.g., a card-holding user) with the payment instrument 110 if the user 102(C) is offered the incentive 128(A) having attributes that include a 10% discount, an offer frequency of once a month, a merchant attribute of "Anywhere," and a reward type "A." In the example of FIG. 3C (like in FIG. 3B), the trained AI model(s) 130 predicts that the user 102(C) will spend $100 over a prescribed time period (e.g., three months) using the payment instrument 110 if the user 102(C) is offered the incentive 128(A).

As shown on the right-hand side of FIG. 3D, the unknown input provided by the metric component 132 to the trained AI model(s) 130 may be user data 118 (e.g., a user ID 302(D)) associated with a second user 102(D) (and/or a signal(s) that is/are generated based on the user data 118), and/or incentive data 120 (e.g., an incentive ID 304(A)) associated with the incentive 128(A) (and/or a signal(s) that is/are generated based on the incentive data 120). The trained AI model(s) 130 may be tasked with generating (and/or outputting) a predicted engagement metric 300 (8) (e.g., a value, a score, a binary (will engage, will not engage) indication, etc.) associated with the second user 102(D), which may indicate, or otherwise relate to, a change in a level of engagement if the user 102(D) is offered the incentive 128(A). Here, the predicted engagement metric 300 (8) that is generated by the trained AI model(s) 130 indicates the change in the level of engagement as a predicted level of engagement of the user 102(D) (e.g., a different card-holding user) with the payment instrument 110 if the user 102(D) is offered the incentive 128(A). In the example of FIG. 3D, the trained AI model(s) 130 predicts the second user 102(D) will spend $300 over a prescribed time period (e.g., three months) using the payment instrument 110 if the user 102(D) is offered the incentive 128(A). Accordingly, contrasting the two pairings of the different users 102(C) and 102(D) with the same incentive 128(A), as shown in FIG. 3D, the optimization component 136 may determine to present the incentive 128(A) to the second user 102(D), but may determine to refrain from presenting the incentive 128(A) to the first user 102(C).

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is an example process 400 for training one or more AI models, according to an implementation of the present subject matter. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 400. The process 400 can be implemented by a system including one or more processors and memory storing computer-executable instructions to cause the one or more processors to perform the process 400. In some examples, the process 400 can be implemented by a processing device(s) (e.g., a computing system and/or a server(s) 112 of the payment service computing platform). For discussion purposes, the process 400 is described with reference to the previous figures.

At 402, training data (or a training dataset) is accessed for use in training one or more AI models 130. In some examples, a server(s) 112 of the payment service computing platform may access the training data at block 402 from the data store(s) 116. In some examples, a server(s) 112 of the payment service computing platform may access the training data at block 402 from an external data source, such as a third-party server(s) 140 and/or a third-party data store(s) 142 associated with a third-party service provider. In other words, various data and/or signals generated on and/or off the payment service computing platform can be accessed and used as training data at block 402. Examples of accessing data and/or signals generated on the payment service computing platform are illustrated in sub-blocks 404 and 406 of FIG. 4. For example, accessing the training data at block 402 may involve accessing user data 118 (e.g., from the data store(s) 116) at sub-block 404. The user data 118 accessed at sub-block 404 may be associated with users 102 of the payment service 108. In some examples, the user data 118 accessed at sub-block 404 is associated with interactions between users 102 of the payment service 108 and the payment application 106. For card-holding users, the user data 118 accessed at sub-block 404 may be associated with transaction history data associated with the payment instrument 110. In general, the user data 118 may be indicative of user transaction history, user purchase history, user interaction history, or the like. In some example, the user data 118 accessed at sub-block 404 includes phone numbers, email addresses, Internet Protocol (IP) addresses, user attributes, user demographics, contextual data about users 102, user preferences, and the like. As another example, accessing the training data at block 402 may involve accessing incentive data 120 (e.g., from the data store(s) 116) at sub-block 406. The incentive data 120 accessed at sub-block 406 may be associated with incentives 128 made available to the users 102 by the payment service 108. In some examples, the incentive data 120 accessed at sub-block 406 is indicative of incentive attributes, such as an amount of a discount, an amount of fiat currency (e.g., a dollar amount), stock, cryptocurrency, or other asset, an offer frequency, a time period for which the incentive is active, a merchant associated with the incentive, a type of the incentive (e.g., reward type), or the like.

At 408, an AI model(s) 130 is/are trained using the training data (or the training dataset) accessed at block 402. In some examples, the server(s) 112 of the payment service computing platform may train the AI model(s) 130 at block 408. In an example, the AI model(s) 130 can be trained at block 408 using the user data 118 accessed at sub-block 404 and/or the incentive data 120 accessed at sub-block 406. In some examples, the training dataset used at block 408 to train the AI model(s) 130 can include features and labels. However, the training dataset may be unlabeled, in some examples. Accordingly, the AI model(s) 130 (e.g., machine learning model(s)) may be trained at block 408 using any suitable learning technique, such as supervised learning, unsupervised learning, semi-supervised learning, reinforcement learning, and so on. The features included in the training dataset can be represented by a set of features, such as in the form of an n-dimensional feature vector of quantifiable information about an attribute of the training dataset. Various features of the user data 118 and/or the incentive data 120 can be used to train the AI model(s) 130 to output a value representing a predicted engagement metric indicating a change in a level of engagement if an individual user 102 of the payment service 108 is offered an incentive 128 having a particular attribute(s). Example features of the user data 118 used in the training dataset may include usage patterns associated with the payment application 106, stored balances associated with the payment application 106, and/or usage patterns associated with the payment instrument 110. For example, the features of the user data 118 may indicate whether a given user 102 opened the payment application 106 the first day after they were onboarded to the payment service 108, or whether the user 102 waited several days, weeks, etc. to open the payment application 106. As another example, the features of the user data 118 may indicate whether a given user 102 made or received a P2P payment and/or a time of the P2P payment relative to the time of onboarding the user 102. As yet another example, the features of the user data 118 may indicate whether a given user has a non-zero balance in their spending account associated with the payment application 106. For card-holding users 102, the features of the user data 118 may indicate a given user's 102 past usage of the payment instrument 110, past usage of incentives 128 associated with usage of the payment instrument 110, etc. Example features of the incentive data 120 used in the training dataset may include amounts of discounts, amounts of fiat currencies, offer frequencies (e.g., every few months, monthly, weekly, bi-weekly, daily, etc.), time periods for which the incentives 128 are active, merchants, types of incentives (e.g., reward types), or the like.

As the AI model(s) 130 is/are trained at block 408, the AI model(s) 130 learns how the features of the training dataset translate to output values representing predicted engagement metrics. For example, at sub-block 410, the AI model(s) 130 can learn how the features of the user data 118 translate to engagement of users 102. As another examples, at sub-block 412, the AI model(s) 130 can learn how the features of the incentive data 120 translate to engagement of users 102. In some examples, the training at block 408 involves machine learning, which may utilize statistical techniques, as well as techniques to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning. In the context of generative AI models, such models can be trained on visual data, text data, audio data, or the like, to generate metrics (or values indicative thereof). During training of the models, a discriminator may be used to evaluate the performance of the model in generating metrics (or values indicative thereof). In some examples, the features of the training dataset may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. In some examples, the training dataset (e.g., the user data 118 and/or the incentive data 120) may be formatted into input vectors and/or signals for the AI model(s) 130 (e.g., machine learning model(s)) to intake, as well as associating the various data with the outcomes (e.g., labeling users and/or user accounts as associated with a particular behavior, such as using an incentive 128, using the payment application 106, conducting a transaction using the payment instrument 110, etc.).

Once trained at block 408, the trained AI model(s) 130 can be used to determine a subset of users 102 of the payment service 108 based on a likelihood of the users 102 changing their level of engagement (e.g., with the payment application 106, with a payment service 108, with a payment instrument 110, etc.) in response to the presentation of the data (e.g., incentives 128), as described herein. The subset 138 of the users 102 who are presented with the data (e.g., incentives 128) may or may not interact with (e.g., select and/or use) the incentives 128, and such information can be collected and used to retrain the trained AI model(s) 130 (e.g., as a reinforcement learning mechanism). At 414, for example, engagement data is collected as users 102 interacted with the incentives 128 that are presented to them via instances of the payment application 106 executing on their respective electronic devices 104. In some examples, the server(s) 112 of the payment service computing platform collects the engagement data associated with one or more of the users at block 414. In some examples, the collected engagement data indicates which of multiple incentives 128 a user selected. For example, if the user interface 200B is presented on an electronic device 104 of a user 102, as shown in FIG. 2B, and if the user selects the first incentive 128(1), the engagement data collected at block 414 may indicate that the first incentive 128 was selected by the user 102.

At 416, the trained AI model(s) 130 is retrained using the engagement data collected at block 414. In some examples, the server(s) 112 of the payment service computing platform retrains the trained AI model(s) 130 at block 416. In some examples, the retraining performed at block 416 may include updating parameters and/or weightings and/or thresholds utilized by the trained AI model(s) 130. In some examples, reinforcement learning techniques are utilized at block 416.

FIG. 5 is an example process 500 for optimizing the presentation of data, according to an implementation of the present subject matter. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 500. The process 500 can be implemented by a system including one or more processors and memory storing computer-executable instructions to cause the one or more processors to perform the process 500. In some examples, the process 500 can be implemented by a processing device(s) (e.g., a computing system and/or a server(s) 112 of the payment service computing platform). For discussion purposes, the process 500 is described with reference to the previous figures.

At 502, a trained AI model(s) 130 is/are applied to user data 118 associated with users 102 of a payment service 108. In some examples, the trained AI model(s) 130 applied at block 502 was trained using the process 400 of FIG. 4. In some examples, a server(s) 112 of the payment service computing platform may execute the metric component 132 to apply the trained AI model(s) 130 to the user data 118 at block 502. In some examples, at block 502, the trained AI model(s) 130 is applied to additional data, such as incentive data 120 associated with incentives 128 made available to the users 102 by the payment service 108. For example, the trained AI model(s) 130 can analyze unique pairings between users 102 and incentives 128 at block 502. At sub-block 504, in some examples, applying the trained AI model(s) 130 at block 502 may cause the trained AI model(s) 130 to associates a value with each of the users 102. The value associated with each of the users 102 may represents a predicted engagement metric 300 indicating a change in a level of engagement if an individual user 102 (e.g., a card-holding user or a non-card-holding user) of the users 102 is offered an incentive 128 having a particular attribute(s). In some examples, the predicted engagement metric 300 indicates the change in the level of engagement of the individual user 102 with the payment instrument 110. For example, the predicted engagement metric 300 may indicate a likelihood of the user 102 ordering (and/or starting to use) the payment instrument 110. As another example, the predicted engagement metric 300 may indicate a predicted level of engagement of the user 102 with the payment instrument 110 (e.g., a prediction that the user 102 will spend $X over a prescribed time period using the payment instrument 110). As yet another example, the predicted engagement metric 300 may indicate a predicted change in the level of engagement of the user 102, relative to a baseline level of engagement for that user 102 (e.g., a prediction that the user 102 will spend $Y more over a prescribed period of time than the user 102 previously spent over the prescribed period of time). In some examples, the predicted engagement metric 300 indicates one or more of: an amount of fiat currency the individual user 102 is predicted to spend over a period of time using a payment instrument 110, a predicted gross profit attributable to the individual user 102, a predicted ROI attributable to the individual user 102, a predicted number of interactions within the payment application 106 attributable to the individual user 102, and/or a predicted stored balance associated with the individual user 102. In some examples, the user data 118 associated with one or more of the users 102 may be non-existent or below a threshold (e.g., when the user 102 is onboarding to the payment service 108 or shortly thereafter). In these examples, and for such users 102, the server(s) 112 can access an external LLM 144, which may have been trained on a larger corpus of data, via the API(s) 146, SDK(s), or the like. The output of the LLM 144 can improve the accuracy of the predicted engagement metric 300 for such users 102 where minimal user data 118 is available.

At 506, the incentive 128 having the particular attribute(s) is generated. In some examples, the server(s) 112 of the payment service computing platform may execute the incentive component 134 to generate the incentive 128 at block 506. At sub-block 508, in an example, the incentive component 134 uses an additional trained AI model(s) 130 to generate the incentive 128 and/or the attribute(s) thereof. For example, the trained AI model(s) 130 may be used at sub-block 508 to generate the incentive 128 having one or more particular attributes based on the relevance of the attribute(s) to a user 102. Such incentive attributes may include an amount of a discount, an amount of fiat currency (e.g., a dollar amount), stock, cryptocurrency, or other asset, an offer frequency, a time period for which the incentive 128 is active, a merchant associated with the incentive, a type of the incentive (e.g., reward type), or the like. For example, the incentive component 134 may use the trained AI model(s) 130 at sub-block 508 to generate a merchant-specific incentive 128 that is predicted to increase the likelihood that a particular user 102 will order (and/or start using) the payment instrument 110, and/or maximize the engagement of the particular user 102 with the payment application 106, with the payment service 108, and/or with the payment instrument 110. As another example, the incentive component 134 may use the trained AI model(s) 130 at sub-block 508 to generate an incentive 128 that is associated with a specific amount of a discount, a specific amount of fiat currency (e.g., dollar amount), a specific stock, cryptocurrency, or other asset, a specific offer frequency, or the like, based on the user data 118 associated with a particular user 102. As yet another example, the incentive component 134 may use a trained AI model(s) 130 to generate fiat currency incentives 128, cryptocurrency incentives 128, stock incentives, or the like, based on the user data 118 associated with a particular user 102. In the various examples described above, the incentive 128 (and/or the attribute(s) thereof) can be dynamically determined (e.g., generated) at sub-block 508, even though the incentive 128 is not already included in the set of existing incentives 128 that are currently made available to the users 102 of the payment service 108. In other words, prior to generating the incentive 128 at block 506, a set of existing incentives 128 made available to the users 102 by the payment service 108 may not have included the incentive 128 generated at block 506.

At sub-block 510, the incentive(s) 128 generated at block 506 may be generated as a personalized and/or customized incentive for a specific user(s) 102 in one or more ways. For example, the payment service computing platform may execute the incentive component 134 to dynamically determine one or more of the attributes for the incentive 128. In an example, the incentive component 134 may be executed to dynamically determine a merchant(s) preferred by a particular user 102 based at least in part on the user data 118 associated with the particular user 102, and to generate the incentive(s) 128 at sub-block 510 having a merchant attribute of the preferred merchant(s). For example, the users data 118 may include user transaction history data associated with a particular merchant that indicates the user 102 frequently visits (and/or purchases items from) a particular merchant, and the incentive 128 generated at sub-block 510 can be an incentive 128 that is conditionally redeemable in association with a future transaction with the merchant(s) frequently visited by the user 102.

At 512, a subset 138 of the users 102 is identified based at least in part on the value (representing the predicted engagement metric 300) associated with each of the users 102. In some examples, the server(s) 112 of the payment service computing platform may execute the optimization component 136 to identify the subset 138 of the users 102 at block 512. The optimization component 136 may be configured to use an optimization framework, algorithm, formulae, or the like to identify the subset 138 of the users 102 at block 512. At sub-block 514, in some examples, the optimization component 136 is configured to rank the users 102 in a ranked order based at least in part on the value associated with each of the users 102, where the value represents the predicted engagement metric 300 described above. For example, if the value representing the predicted engagement metric 300 indicates an amount of fiat currency (e.g., a dollar amount) an individual user 102 is predicted to spend over a period of time using the payment application 106, the payment service 108, and/or the payment instrument 110, a first value of $200 may be associated with a first user 102, a second value of $300 may be associated with a second user 102, and so on and so forth for any number of users 102. In this example, the optimization component 136 may be configured to rank the second user 102 higher than the first user 102 in a ranked list of users 102 because the second user 102 is predicted to spend $100 more than the first user 102 if the users 102 are offered an incentive 128 having a particular attribute(s). This is merely an example, and it is to be appreciated that ranking schemes can be utilized at sub-block 514 based at least in part on the user-associated values representing the predicted engagement metrics. In some examples, the optimization component 136 may utilize a trained AI model(s) 130 to generate a ranked list of users 102 at sub-block 514. For example, the optimization component 136 may provide the user-associated values representing the predicted engagement metrics 300 (and/or a signal(s) that is/are generated based on the metrics) as input to a trained AI model(s) 130, and the model(s) 130 may be tasked with generating a ranked list (e.g., a N-best list) of the users 102 at sub-block 514. Moreover, the optimization component 136 may be configured to select the identified subset 138 of the users 102 from the ranked list of the users 102 at sub-block 514. For example, the identified subset 138 may represent the users 102 that are ranked highest in the ranked list (e.g., the top hundred users 102, the top thousand users 102, etc.). In some examples, Equations (1) to (3) may be used with an optimization framework, as described above, to identify the subset 138 of the users at block 512. At sub-block 516, in some examples, a number of the users 102 in the identified subset 138 can be dynamically determined based at least in part on a cost of offering the incentive(s) 128 and a fixed budget. For example, an incentive campaign may be constrained to a fixed budget to cover the cost of offering incentives 128 to the users 102 of the payment service 108.

Accordingly, the identified subset 138 may include a number of users 102 that, if offered incentives 128, will not exceed the fixed budget for the incentive campaign.

At 518, the incentive(s) 128 generated at block 506 is/are caused to be presented via a user interface(s) 200B of a payment application 106 associated with the payment service 108 and executing on a device(s) 104 of a user(s) 102 in the subset 138. In some examples, the server(s) 112 of the payment service computing platform may execute the optimization component 136 to cause the incentive(s) 128 to be presented via the user interface(s) 200B at block 518. At sub-block 520, in some examples, the incentive(s) 128 is/are set to, or otherwise associated with, an inactive state when presented via the user interface(s) 200B at block 518. In this example, a user(s) 102 in the identified subset 138 can provide input to the electronic device(s) 104 to active the incentive(s) 128. For example, a user 102 in the identified subset 138 may provide an input (e.g., touch input) to their electronic device 104 to interact with (e.g., select) the interactive element 208 shown on the user interface 200B in FIG. 2B, which, in turn, will activate the incentive 128(1) presented via the user interface 200B. Accordingly, at sub-block 520, the payment application 106 and/or the server(s) 112 of the payment service computing platform may receive an indication(s) of an input(s) indicating a selection(s) of the incentive(s) 128 presented at block 518, and, based at least in part on receiving the indication(s) of the input(s), the payment application 106 and/or the server(s) 112 of the payment service computing platform can activate the incentive(s) 128 to an active state. The active state may cause a given incentive 128 to be conditionally redeemable. For example, an incentive 128 in the active state may be conditionally redeemable in association with a future transaction for which payment is made using the payment instrument 110, and/or conditionally redeemable for a limited period of time and/or at a particular location in association with a future transaction for which payment is made using a payment instrument 110. In some examples, multiple incentives 128 are presented via an individual user interface 200B of a payment application 106 executing on a device 104 of a particular user 102 in the subset 138. In these examples, the incentives 128 can be presented in a ranked order based on the user 102 and/or other criteria, and engagement data can be collected by the payment application 106 and/or by the server(s) 112 of the payment service computing platform, as described above, the engagement data indicating which of the multiple incentives 128 the user 102 selected, if any, which may be useful in retraining the trained AI model(s) 130, as described above. At sub-block 522, in some examples, a message(s) notifying the user(s) 102 in the subset 138 about an availability of the incentive(s) 128 is sent. The user interface 200A of FIG. 2A provides an example of such a notification message 202, which may be output (e.g., presented) via the electronic device(s) 104 of the user(s) 102.

In some examples, the incentive(s) 128 presented via the user interface(s) 200B at block 518 are presented as a result(s) to a search query (e.g., a search result). By presenting the incentive(s) 128 as a search result based on the predicted engagement metric 300, the search result is likely to change (e.g., increase, decrease, etc.) the user's 102 level of engagement (e.g., with the payment application 106, with the payment service 108, and/or with the payment instrument 110) and/or cause the user 102 to engage more or less than other users 102. This can also improve functionality of computing devices by causing user interfaces (e.g., the user interface(s) 200B) to be less cluttered and easier to interact.

For small form factors, such as mobile devices or wearables, this personalization or customization can optimize how content is displayed and accessed, thereby offering an improvement to the functionality of computing devices.

In some examples, the incentive(s) 128 presented via the user interface(s) 200B at block 518 can be ranked based at least in part on the data stored in the data store(s) 116. In some examples, AI model(s) 130 can analyze such data in view of a set of one or more incentives 128 to determine a ranking, for example, based on relevance to a particular user 102, characteristic of a user 102 (e.g., age, location, etc.), or the like. In some examples the set of one or more incentives 128 can be input into a generative AI model, such as a LLM, with a prompt to rank the set of one or more incentives 128 based on information known about a user 102 or characteristic(s) of a user 102. In some examples, the LLM can be an internal LLM (e.g., an AI model(s) 130 implemented as a LLM), trained on data stored in the data store(s) 116. In some examples, the LLM can be an external LLM 144, trained on a larger corpus of data, and integrated into the payment service computing platform, for example by one or more APIs 146, SDKs, or the like. In some examples, the incentives 128 can be ranked based on an output of the LLM 144, which can be trained using additional or alternative data (e.g., a larger dataset). In some examples, the output of the LLM 144 can be an input into the AI model(s) 130 trained using the data stored in the data store(s) 116 (e.g., internal data). In some examples, the LLM output or the combination of the LLM output and output of the AI model(s) 130 can improve the relevance of the ranking to individual users 102 or users 102 with particular characteristics. This approach can be particularly useful where the user data 118 for a particular user 102 is non-existent or below a threshold (e.g., when the user 102 is onboarding to the payment service 108).

In some examples, the incentive(s) 128 presented via the user interface(s) 200B at block 518 can be ranked using user interaction and/or session-level data. In such examples, user data 118 and/or session-level data can be input into a generative AI model, such as a LLM (internal or external), which can be used to generate an output of user intent. This output can be an explicit understanding or an implicit understanding. Using the output of user intent, the incentives 128 can be ranked or reranked so that incentives 128 relevant to the user's intent are presented prior to those that are less relevant to the user's intent. In some examples, the output of user intent can be an input to the AI model(s) 130.

In some examples, the incentive(s) 128 presented via the user interface(s) 200B at block 518 can be grouped, for example, based on merchant type, incentive amount, incentive type, geolocation, redemption time, etc. In some examples, the AI model(s) 130 can be used to create such groups, for example by taking a set of incentives 128 and creating categories or assigning incentives 128 to categories using category names. In some examples, such grouping can be done using generative AI, such as an LLM (internal or external). That is, the LLM can create categories from sets of incentives 128 and/or assign incentives 128 to categories using category names. In some examples, a prompt can instruct the LLM to group incentives 128 in a particular number, based on a particular characteristic, or the like. In some examples, the AI model(s) 130 can rank the categories using techniques described herein such that categories that are likely to be more relevant to individual users 102 and/or are likely to drive more engagement are presented prior to other categories that are less relevant and/or less likely to drive engagement. In some examples, the optimization component 136 is configured to rank the incentives 128 and/or the categories as described above, and, in some cases, the optimization component 136 can utilize the AI model(s) 130 and/or the external LLM(s) 144 accessible via the API(s) 146, SDK(s), or the like.

In some examples, groups of incentives 128 presented via the user interface(s) 200B at block 518 can be named using the AI model(s) 130. In an example, a set of incentives 128 can be input into a generative AI model, such as an LLM (internal or external), to generate embeddings. From the embeddings, individual incentives 128 of the incentives 128 can be grouped together. Characteristics of the incentives 128 in each group can be input into an LLM with a prompt to create a name for the grouping. The LLM can output one or more names, which can be selected and presented proximate to or as a representation of one or more incentives 128 in the grouping (e.g., on the user interface 200B).

FIG. 6 is an example process 600 for dynamically adjusting an amount of a discount associated with an incentive 128 based on a number of users 102 who collectively request to redeem the incentive 128, according to an implementation of the present subject matter. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 600. The process 600 can be implemented by a system including one or more processors and memory storing computer-executable instructions to cause the one or more processors to perform the process 600. In some examples, the process 600 can be implemented by a processing device(s) (e.g., a computing system and/or a server(s) 112 of the payment service computing platform). For discussion purposes, the process 600 is described with reference to the previous figures.

At 602, one or more requests to redeem an incentive 128 are received. In some examples, a server(s) 112 of the payment service computing platform may receive the request(s) to redeem the incentive 128 at block 602. In some examples, the request(s) may be received in response to one or more actions being performed by a user(s) 102 of the payment service 108. For example, if a user 102 activates an incentive 128 so that the incentive 128 is conditionally redeemable in association with a future transaction for which payment is made using the payment instrument 110, and if the user 102 subsequently uses the payment instrument 110 to make the payment for the transaction, this may trigger a request to be sent to the server(s) 112 of the payment service computing platform, and this request may be received at block 602 as a result.

At 604, a determination is made as to whether multiple requests were received at block 602. If a single request was received at block 602, the process 600 may follow the NO route from block 604 to block 606 where the incentive 128 is redeemed in association with the transaction. In this scenario (e.g., following the NO route from block 604), a discount applied to the payment may be an original discount associated with the incentive 128. If, at 604, it is determined that multiple requests were received at block 602, the process 600 may follow the YES route from block 604 to block 608.

At 608, based at least in part on receiving multiple requests at block 602, an amount of a discount associated with the incentive 128 is dynamically increased to obtain an increased discount. In some examples, the server(s) 112 of the payment service computing platform may increase the discount associated with the incentive 128 at block 608. In some examples, the amount by which the discount amount is increased is based at least in part on a number of the requests that were received at block 602. For example, if two requests were received at block 602, the amount of the discount may be increased to first increased discount, whereas, if three requests were received at block 602, the amount of the discount may be increased to a second increased discount greater than the first increased discount. Following block 608, the incentive 128 is redeemed, at block 606, in association with respective transactions for multiple users 102 associated with the multiple requests. In this scenario, the increased discount is applied to respective payments made by the multiple users 102 for completing the transactions. Accordingly, the process 600 is illustrative of a technique for implementing "team incentives," where multiple users 102 can join together (knowingly or unknowingly) to redeem (e.g., claim) the incentive 128 as a way of making the incentive more valuable.

In some examples, the ability to increase or decrease an amount of an incentive 128 can be tied to a time period such that if a threshold number of other users 102 request to redeem an incentive 128 within the time period, the amount of the incentive 128 can increase. However, if the threshold number of other users 102 do not request to redeem the incentive 128 within the time period, the amount of the incentive 128 does not increase, or may not increase to the same amount. In some examples, users 102 can share or promote incentives 128 via the payment application 106, social networks, referrals, or the like.

In other examples, an incentive 128 may be associated with an inactive state (for all users 102) until a threshold number of users 102 request to redeem the incentive 128 such that if a threshold number of other users 102 request to redeem an incentive 128, the state of the incentive 128 can be updated to active. However, if the threshold number of other users 102 do not request to redeem the incentive 128, the state of the incentive 128 can remain inactive.

While FIG. 6 relates to dynamically modifying incentives 128 based on a number of requests to redeem the incentives 128 exceeding a threshold, being received within a time period, or the like, techniques described in FIG. 6 can be applicable to requests to associate or "claim" incentives 128, share incentives 128, or the like.

The examples described above relate to targeting the right users 102 with the right incentives 128 at the right times across the respective lifecycles of the users 102 and the incentives 128. The example process 700 of FIG. 7, described below, relates to targeting a particular subset of users 102 with partnership recommendations, which is another example type of data that may be presented to an identified subset of the users 102 of the payment service 108. For example, some of the users 102 of the payment service 108 may be artists who create content (e.g., music, movies, books, etc.) for a living. Other users 102 of the payment service 108 may be merchants (sometimes referred to as "brands" in this example). With conventional systems, there is no reliable communication mechanism for brands to communicate with artists to solicit a partnership between the brand and the artist. For instance, if a brand wants to partner with an artist, the brand must determine the artist's email address or phone number (or that of the artist's agent), and reach out to the artist in a cold-call fashion. However, artists tend to keep their contact information private to avoid unwanted communications from the general public, which makes it difficult for a brand to locate reliable, accurate contact information for artists. Moreover, despite the efforts most artists take to keep their contact information relatively private, many artists still receive unwanted communications and spam-type messages for "fake" partnerships.

The techniques, devices, and systems described herein allow for providing recommendations for artists to partner with brands based on listener/purchaser overlap. In some examples, supporters (e.g., of an artist) are provided with an option to provide the artist with funding to execute a sync with a brand. Accordingly, the server(s) 112 of the payment service computing platform may be configured to execute the optimization component 136 to recommend, to artists and/or to brands, partnerships between artists and brands. Both the artist and the brand may have verified accounts on the payment service computing platform, and may have designations (e.g., account types) that enable different capabilities for each user 102. For example, a verified brand account may have functionality enabled to request a brand partnership with an artist, but a regular user account may not have this functionality enabled-thus filtering communications on the platform.

The payment service computing platform may be configured to receive or access various signals, both on the payment service computing platform (e.g., where a user 102 shops) and off the payment service computing platform. For example, the payment service computing platform may collect user data from a third-party server(s) 140 and/or a third-party data store(s) 142 associated with a third-party service provider, such as a third-party service provider of a music, podcast and/or video streaming service. In this manner, the optimization component 136 is able to determine what a user 102 listens to on a third-party streaming service to determine overlapping user segments between an artist and a brand. The overlapping user segments may be based on demographic information, similar brands that an artist has partnered with, similar artists that the brand has partnered with, and the like. The optimization component 136 can provide a recommendation to one or both of the brand and the artist to create a partnership. The recommendation may open a communication channel between the brand and the artist that did not exist prior to the recommendation being provided-thus validating the reliability of the communication between the entities. The overlapping user segments provide improved recommendations for partnerships that are data driven and contextually relevant.

Once a partnership is established, the payment service computing platform can execute the optimization component 136 to provide investment recommendations for the brand and/or the artist based on signals about users 102 on the platform. For instance, if a user 102 is looking at investing in Merchant A via the payment application 106, the payment application 106 can surface which artists Merchant A partners with to give the user 102 a better feel for the business. The artist could use the partnership opportunity to solicit an advance from investors, which they pay back after the artist is paid on the partnership contract.

FIG. 7 is an example process 700 for providing a partnership recommendation to one or both of an artist or a merchant, according to an implementation of the present subject matter. The process 700 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 700. The process 700 can be implemented by a system including one or more processors and memory storing computer-executable instructions to cause the one or more processors to perform the process 700. In some examples, the process 700 can be implemented by a processing device(s) (e.g., a computing system and/or a server(s) 112 of the payment service computing platform). For discussion purposes, the process 700 is described with reference to the previous figures.

At 702, transaction data associated with a first user group is received. In some examples, a server(s) 112 of the payment service computing platform may receive the transaction data at block 702. In some examples, the transaction data is received at block 702 based on transactions conducted by users 102 of the first user group with merchants (e.g., using the payment application 106 and/or using the payment instrument 110). In some examples, the transaction data received at block 702 indicates merchants that the first user group transacted with on the payment service computing platform and/or on a different platform (e.g., transaction data received from a third-party server(s) 140 and/or a third-party data store(s) 142).

At 704, engagement data associated with a second user group is received. In some examples, the server(s) 112 of the payment service computing platform may receive the engagement data at block 704. In some examples, the engagement data is received at block 704 based on engagements of users 102 of the second user group with artists on a media platform (e.g., a third-party server(s) 140 associated with a media platform of a third-party service provider of a music, podcast and/or video streaming service). In some examples, the engagement data indicates artists that the second user group engaged with on the media platform. Examples of the engagement data received at block 704 include ticket purchase data (e.g., tickets to concerts, venues, events, etc., purchased by the second user group), streaming data (e.g., music, podcasts, and/or videos streamed by the second user group), content sharing data (e.g., music, playlists, etc., shared by the second user group), social media data (e.g., music, podcasts, videos, playlists, artists, etc., liked and/or followed by the second user group), fan data (e.g., artist subscriptions associated with the second user group), merchandise data (e.g., artist merchandise purchased by the second user group), financial data (e.g., funds spent on entertainment sites, etc.).

At 706, a user segment of users in both the first user group and the second user group is determined. In some examples, the server(s) 112 of the payment service computing platform may determine the user segment at block 706. In some examples, the user segment is determined based at least in part on user data 118 that is common to both the first user group and the second user group (e.g., matching user IDs).

At 708, based at least in part on the user segment determined at block 706, an artist of the artists is identified, and a merchant of the merchants is identified, which allows for providing a partnership recommendation. In some examples, the server(s) 112 of the payment service computing platform may identify the artist and the merchant at block 708. In some examples, the subset 138 of users depicted in FIG. 1 represents the identified artist and the identified merchant.

At 710, the partnership recommendation is provided to one or both of the artist and the merchant, and/or to another entity, such as an authorized user associated with the artist (e.g., an agent(s) of the artist, a manager(s) of the artist, etc.). In some examples, the server(s) 112 of the payment service computing platform may provide the partnership recommendation at block 710. In some examples, providing the partnership recommendation at block 710 involves sending a message (e.g., an email, an in-app notification message, a text message, etc.) to the artist and/or the merchant. In some examples, providing the partnership recommendation at block 710 involves causing the partnership recommendation to be presented via a user interface of the payment application 106. In some examples, the partnership recommendation (and/or the provisioning thereof) establishes a communication channel between the artist and the merchant. Once a partnership is established, the payment service computing platform can execute the optimization component 136 to further provide investment recommendations for the merchant and/or the artist based on signals about users 102 on the platform. For instance, if a user 102 is looking at investing in the merchant identified at block 708 via the payment application 106, the payment application 106 can surface which artists the identified merchant partners with to give the user 102 a better feel for the business. The artist identified at block 708 could use the partnership opportunity to solicit an advance from investors, which they pay back after the artist is paid on the partnership contract. The process 700 of FIG. 7 can be used to determine which users, of a user population, are to be presented with data (e.g., partnership recommendations) based on an artist and a merchant identified from a user segment with users in the two different user groups, as described above.

Figure 8:
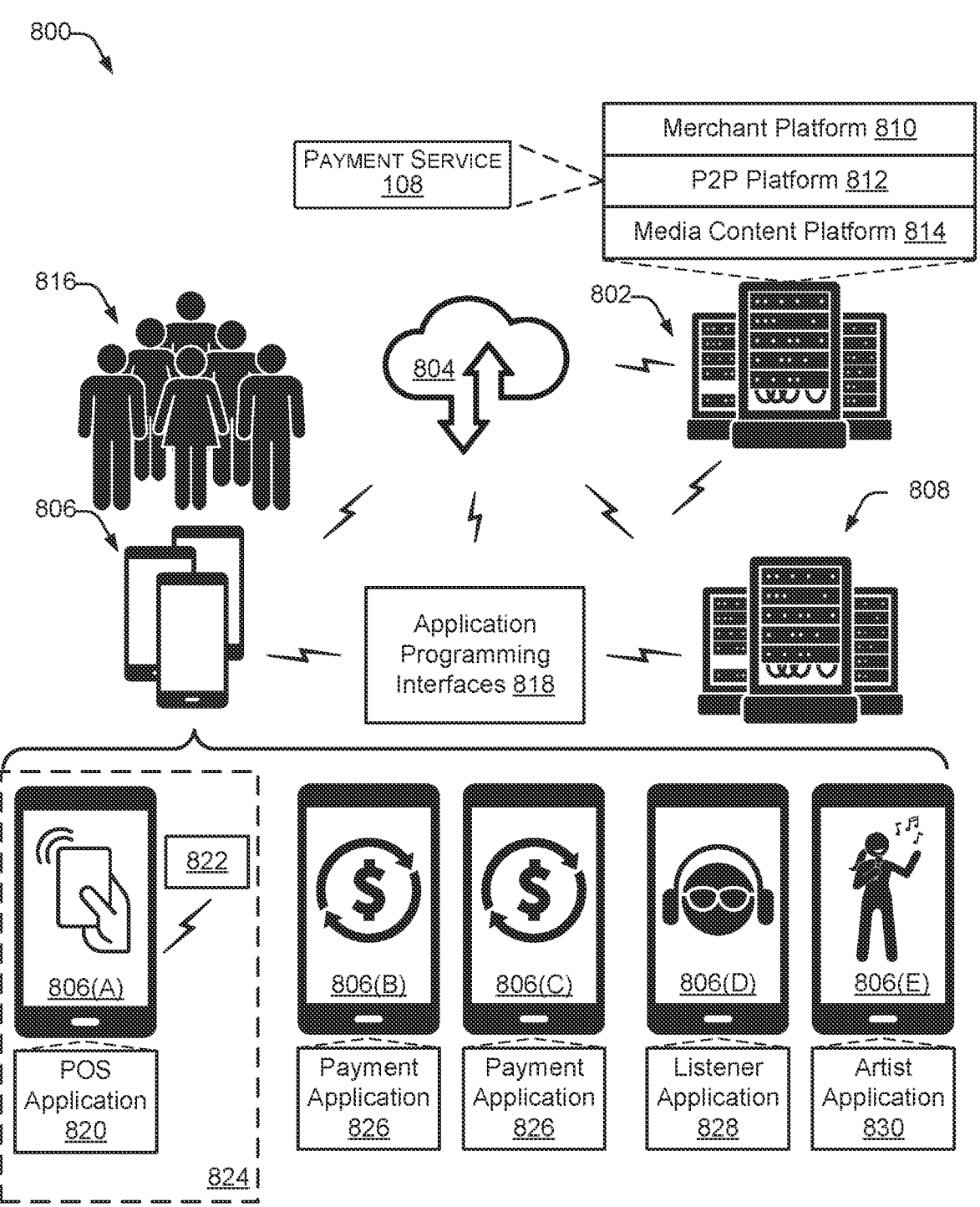
FIG. 8 is an example environment for performing techniques described herein.

FIG. 8 illustrates an example environment 800. The environment 800 includes server(s) 802 that can communicate over a network 804 with end user devices 806 and/or server(s) 808 associated with third-party service provider(s). In various examples, the end user devices 806 may comprise one or more seller devices 806(A), one or more user devices 806(B) and/or 806(C) in a peer network, one or more content consumption devices 806(D), one or more artist user devices 806(E), combinations of these examples, or other categories of user devices. The server(s) 802 can be associated with one or more service providers that can provide one or more services for the benefit of users 816, as described below. For example, the server(s) 802 may enable services of service providers such as in association with a merchant platform 810 (which may further include a buyer platform), a peer-to-peer (P2P) payment platform 812, a media content platform 814, a combination of these platforms, or other platforms associated with other service providers. While services and features are referenced throughout in connection with a particular one of the merchant platform 810, the P2P payment platform 812, or the media content platform 814, it should be understood that any of these platforms may perform the functionality described in relation to any of the other platforms. Actions attributed to the service provider(s) can be performed by the server(s) 802.

In some examples, the server(s) 802 may be the same as or similar to the server(s) 112 introduced in FIG. 1, and the server(s) 802 may implement the payment service 108, which may include the AI model(s) 130, the metric component 132, the incentive component 134, and/or the optimization component 136, as described herein. Furthermore, the server(s) 808 may be the same as or similar to the server(s) 140 introduced in FIG. 1, the end user device(s) 806 may be the same as or similar to the electronic device 104 introduced in FIG. 1, the users 816 may be the same as or similar to the users 102 introduced in FIG. 1, and the network(s) 804 may be the same as or similar to the network(s) 114 introduced in FIG. 1.

In accordance with the examples described herein, the server(s) 802 may optimize the presentation of data. For instance, the server(s) 802 may apply a trained AI model to user data associated with users 816 of a payment service 108, wherein the trained AI model associates a value with each of the users 816, and wherein the value represents a predicted engagement metric indicating a change in a level of engagement if an individual user of the users 816 is offered an incentive having a particular attribute. The server(s) 802 may generate the incentive having the particular attribute, identify a subset of the users 816 based at least in part on the value, and cause the incentive to be presented via a user interface of a payment application 826 associated with the payment service 108 and executing on a device 806 of a user 816 in the subset.

In some examples, individual ones of the end user devices 806 can be operable by users 816. The users 816 (individually referred to herein as "user 816") can be referred to as customers, buyers, merchants, sellers, borrowers, employees, employers, payors, payees, couriers, artists, musicians, listeners, fans, supervisors, hosts, audience members, and so on. The users 816 can interact with the end user devices 806 via user interfaces presented via the end user devices 806. In at least one example, a user interface can be presented via a web browser, or the like. Alternatively or additionally, a user interface can be presented via an application, such as a mobile application or desktop application, which can be provided by the merchant platform 810, the P2P payment platform 812, and/or the media content platform 814, or which can be an otherwise dedicated application. In some examples, individual end user devices 806 can have an instance or versioned instance of an application, which can be downloaded from an application store, for example, which can present the user interface(s) described herein.

In at least one example, the users 816 can include merchants that can operate the seller device(s) 806(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 806(A) can have an instance of a point of sale ("POS") application 820 stored thereon. The POS application 820 can configure the seller device 806(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 820 can determine transaction data associated with the POS transactions. Transaction data can include payment information, which can be obtained from a reader device 822 associated with the seller device 806(A), user authentication data, purchase amount information, point-of-purchase information (e.g., item(s) purchased, date of purchase, time of purchase, subscription type, etc.), etc. The POS application 820 can send transaction data to the server(s) 802 such that the server(s) 802 can track transactions of the customers, merchants, and/or the users 816 over time. Furthermore, the POS application 820 can present a UI to enable the merchant to interact with the POS application 820 and/or the merchant platform 810 via the POS application 820.

In at least one example, the seller device 806(A) can be a special-purpose computing device configured as a POS terminal (via the execution of the POS application 820). In at least one example, the POS terminal may be connected to a reader device 822, which is capable of accepting a variety of payment instruments, such as credit cards, debit cards, gift cards, short-range communication based payment instruments, and the like, as described below. In at least one example, the reader device 822 can plug in to a port in the seller device 806(A), such as a microphone port, a headphone port, an audio-jack, a data port, or other suitable port. In additional or alternative examples, the reader device 822 can be coupled to the seller device 806(A) via another wired or wireless connection, such as via Bluetooth®, BLE, and so on. In some examples, the reader device 822 can be a software solution executing on the POS terminal, e.g., a mobile phone. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 822, and communicate with the merchant platform 810, which can provide, among other services, a payment processing service. The server(s) 802 associated with the merchant platform 810 can communicate with server(s) 808, as described below. In this manner, the POS terminal and reader device 822 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to customers of a merchant. In additional or alternative examples, the POS terminal can have a display integrated therein for presenting information to the customers of the merchant. POS systems, such as the POS system 824, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 822, whereby the reader device 822 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 824, the server(s) 802, and/or the server(s) 808 may exchange payment information and transaction data to determine whether transactions are authorized. For example, the POS system 824 may provide encrypted payment data, user authentication data, purchase amount information, point-of-purchase information, etc. (collectively, transaction data) to server(s) 802 over the network(s) 804. The server(s) 802 may send the transaction data to the server(s) 808.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 808 associated therewith) can forward the fund transfer request to an issuing bank (e.g., "issuer"). The issuer is a bank or financial institution that offers a financial account (e.g., credit or debit card account) to a user. The issuer (e.g., the server(s) 808 associated therewith) can make a determination as to whether the customer has the capacity to absorb the relevant charge associated with the payment transaction. In at least one example, the merchant platform 810 can serve as an issuer and/or can partner with an issuer. The transaction is either approved or rejected by the issuer and/or the card payment network (e.g., the server(s) 808 associated therewith), and a payment authorization message is communicated from the issuer to the POS device via a path opposite of that described above, or via an alternate path.

The server(s) 808 may send an authorization notification over the network(s) 804 to the server(s) 802, which may send the authorization notification to the POS system 824 over the network(s) 804 to indicate whether the transaction is authorized. The server(s) 802 may also transmit additional information such as transaction identifiers to the POS system 824. In one example, the server(s) 802 may include a merchant application and/or other functional components for communicating with the POS system 824 and/or the server(s) 808 to authorize or decline transactions (e.g., the API 818). In examples, the merchant platform 810 can enable the merchants to receive cash payments, payment card payments, and/or electronic payments from customers for POS transactions and the service provider can process transactions on behalf of the merchants.

Based on the authentication notification that is received by the POS system 824 from server(s) 802, the merchant may indicate to the customer whether the transaction has been approved. In some examples, approval may be indicated at the POS system 824, for example, at a display of the POS system 824. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 810 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 806 can access all of the services. In some cases, the users 806 can have gradated access to the services, which can be based on risk tolerance, IDV outputs, subscriptions, and so on. In at least one example, access to such services can be availed to the merchants via the POS application 820. In additional or alternative examples, each service can be associated with its own access point (e.g., application, web browser, etc.).

As the merchant platform 810 processes transactions on behalf of the merchants, the merchant platform 810 can maintain accounts or balances for the merchants in one or more ledgers. For example, the merchant platform 810 can analyze transaction data received for a transaction to determine an amount of funds owed to a merchant for the transaction and deposit funds into an account of the merchant. The account can have a stored balance, which can be managed by the merchant platform 810. The account can be different from a conventional bank account at least because the stored balance is managed by a ledger of the merchant platform 810 and the associated funds are accessible via various withdrawal channels including, but not limited to, scheduled deposit, same-day deposit, instant deposit, and a linked payment instrument.

A scheduled deposit can occur when the merchant platform 810 transfers funds associated with a stored balance of the merchant to a bank account of the merchant that is held at a bank or other financial institution (e.g., associated with the server(s) 808). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 810 to the bank account of the merchant.

In at least one example, the merchant platform 810 may provide inventory management services. That is, the merchant platform 810 may provide inventory tracking and reporting. Inventory management services may enable the merchant to access and manage a database storing data associated with a quantity of each item that the merchant has available (i.e., an inventory). Furthermore, in at least one example, the merchant platform 810 can provide catalog management services to enable the merchant to maintain a catalog, which can be a database storing data associated with items that the merchant has available for acquisition (i.e., catalog management services). The merchant platform 810 can offer recommendations related to pricing of the items, placement of items on the catalog, and multi-party fulfillment of the inventory, to name a few examples.

In at least one example, the merchant platform 810 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 810 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 810 can provide financing services for offering and/or lending a loan to a borrower that is to be used for, in some instances, financing the borrower's short-term operational needs (e.g., a capital loan). Additionally or alternatively, the merchant platform 810 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 810 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 810 can provide web-development services, which enable users 816 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 810 can recommend and/or generate content items to supplement omni-channel presences of the merchants.

Furthermore, the merchant platform 810 can provide payroll services to enable employers to pay employees for work performed on behalf of employers. In at least one example, the merchant platform 810 can receive data that includes time worked by an employee (e.g., through imported timecards and/or POS interactions), sales made by the employee, gratuities received by the employee, and so forth. Based on such data, the merchant platform 810 can make payroll payments to employee(s) on behalf of an employer via the payroll service. For instance, the merchant platform 810 can facilitate the transfer of a total amount to be paid out for the payroll of an employee from the bank of the employer to the bank of the merchant platform 810 to be used to make payroll payments. In at least one example, when the funds have been received at the bank of the merchant platform 810, the merchant platform 810 can pay the employee, such as by check or direct deposit.

Moreover, in at least one example, the merchant platform 810 can provide employee management services for managing schedules of employees. Further, the merchant platform 810 can provide appointment services for enabling users 816 to set schedules for scheduling appointments and/or users 816 to schedule appointments.

In some examples, the merchant platform 810 can provide restaurant management services to enable users 816 to make and/or manage reservations, to monitor front-of-house and/or back-of-house operations, and so on. In such examples, the seller device(s) 806(A) and/or server(s) 802 can be configured to communicate with one or more other computing devices, which can be located in the front-of-house (e.g., POS device(s)) and/or back-of-house (e.g., kitchen display system(s) (KDS)). In at least one example, the merchant platform 810 can provide order management services and/or fulfillment services to enable restaurants (or other merchant types) to manage open tickets, split tickets, and so on and/or manage fulfillment services.

In some examples, the merchant platform 810 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 810 can leverage other merchants and/or sales channels that are part of the merchant platform 810 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 810 can enable conversational commerce via conversational commerce services, which can use one or more machine learning mechanisms to analyze messages exchanged between two or more users 816, voice inputs into a virtual assistant or the like, to determine intents of user(s) 816. In some examples, the merchant platform 810 can utilize determined intents to automate customer service, offer promotions, provide recommendations, or otherwise interact with customers in real-time. In at least one example, the merchant platform 810 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 816 may be new to the merchant platform 810 such that the user 816 that has not registered (e.g., subscribed to receive access to one or more services offered by the merchant platform 810) with the merchant platform 810. The merchant platform 810 can offer onboarding services for registering a potential user 816 with the merchant platform 810. In some examples, onboarding can involve presenting various questions, prompts, and the like to a potential user 816 to obtain information that can be used to generate a profile for the potential user 816. In at least one example, the merchant platform 810 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 810 can be transitioned to more permissive (e.g., less limited) or longer-term access to such services.

The merchant platform 810 can be associated with IDV services, which can be used by the merchant platform 810 for compliance purposes and/or can be offered as a service, for instance to third-party service providers (e.g., associated with the server(s) 808). That is, the merchant platform 810 can offer IDV services to verify the identity of users 816 seeking to use or using their services. Identity verification may involve requesting a customer (or potential customer) to provide information that is used by compliance departments to prove that the information is associated with an identity of a real person or entity (e.g., an artist). In at least one example, the merchant platform 810 can perform services for determining whether identifying information provided by a user 816 accurately identifies the customer (or potential customer).

Techniques described herein can be configured to operate in both real-time/online and offline modes. "Online" modes refer to modes when devices are capable of communicating with the merchant platform 810 while offline mode refers to modes when devices are unable to communicate with the server(s) 808 due to network connectivity issue, for example. In such examples, devices may operate in "offline" mode where at least some payment data is stored (e.g., on the seller device(s) 806(A)) and/or the server(s) 802 until connectivity is restored and the payment data can be transmitted to the server(s) 802 and/or the server(s) 808 for processing.

In at least one example, the merchant platform 810 can be associated with a hub, such as an order hub, an inventory hub, a fulfillment hub and so on, which can enable integration with one or more additional service providers (e.g., associated with the additional server(s) 808). In some examples, such additional service providers can offer additional or alternative services and the service provider can provide an interface or other computer-readable instructions to integrate functionality of the service provider into the one or more additional service providers.

Turning now to the P2P functionality provided by the environment 800, the P2P platform 812 can provide a peer-to-peer payment service that enables peer-to-peer payments between two or more of the users 816. Two or more of the users 816 may be considered "peers" in a peer-to-peer interaction, such as a payment. In at least one example, the P2P platform 812 can communicate with instances of a payment application 826 (or other access point) installed on end user devices 806 configured for operation by the users 816. In an example, an instance of the payment application 826 executing on a first user device 806(B) operated by a payor (e.g., one of the users 816) can send a request to the P2P platform 812 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 816) via a peer-to-peer payment. In some examples, assets associated with an account of the payor are transferred to an account of the payee. In some examples, assets can be held at least temporarily in an account of the P2P platform 812 prior to transferring the assets to the account of the payee.

In some examples, the P2P platform 812 can utilize a ledger system to track transfers of assets between users 816. FIG. 9, below, provides additional details associated with such a ledger system. The ledger system can enable users 816 to own fractional shares of assets that are not conventionally available. For instance, a user can own a fraction of a Bitcoin, an NFT, or a stock. Additional details are described herein.

In at least one example, the P2P platform 812 can facilitate transfers and can send notifications related thereto to instances of the payment application 826 executing on user device(s) of payee(s). As an example, the P2P platform 812 can transfer assets from an account of a first user to an account of a second user and can send a notification to the user device 806(B) of the second user for presentation via a user interface. The notification can indicate that a transfer is in process, a transfer is complete, or the like. In some examples, the P2P platform 812 can send additional or alternative information to the instances of the payment application 826 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 812 funds the request to payee on behalf of the payor, to speed up the transfer process and compensate for lags that may be attributed to the payor's financial network.

In some examples, the P2P platform 812 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 826 executing on the end user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 812 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 8 or a third-party service provider associated with the server(s) 808. In examples where the content provider is a third-party service provider, the server(s) 808 can be accessible via one or more APIs 818 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 812 (e.g., the P2P platform 812 offers a chat or messaging service that is within the payment application or accessible via the payment application). In some examples, the messaging application can be external to the P2P platform 812. (e.g., the messaging application is hosted by a third-party service provider associated with the server(s) 808, which can be accessible via one or more of the APIs 818 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 812 can enable users 816 to perform banking transactions via instances of the payment application 826. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 812 can enable users to allocate funds between different accounts, sub-accounts, or balances (e.g., spending, saving, different assets, different currencies), etc. Further, users 816 can configure bill pay, recurring payments, and/or the like using assets associated with their accounts. In some examples, the P2P platform 812, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 812 enables users to buy and/or sell assets via asset networks such as cryptocurrency networks, securities networks, and/or the like. In some examples, acquisition of such assets can be in whole or fractional shares. The ledger system described below with reference to FIG. 9 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 812 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 812 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 812 can automatically apply the amount of funds associated with the gift card to the transaction.

In some examples, users can configure their account such that when they use their payment instruments, the P2P platform 812 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 812 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 812 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 812 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 812.

In some examples, components of the environment 800 may be integrated to enable payments at the point-of-sale using assets associated with user accounts of the P2P platform 812. As illustrated in the environment 800, the components can communicate with one another via the network 804, where one or more APIs 818 or other functional components can be used to facilitate such communication.

In at least one example, an integration can enable a customer to participate in a transaction via their own computing device (e.g., user device 806(B)) instead of interacting with a merchant device of a merchant, such as the seller device 806(A). In such an example, the POS application 820, associated with a payment processing platform and executable by the seller device 806(A) of the merchant, can present a Quick Response (QR) code, or other code that can be used to identify a transaction (e.g., a transaction code), in association with a transaction between the customer and the merchant. The QR code, or other transaction code, can be provided to the POS application 820 via an API 818 associated with the peer-to-peer payment platform. In an example, the customer can utilize their own computing device, such as the user device 806(B), to capture the QR code, or the other transaction code, and to provide an indication of the captured QR code, or other transaction code, to server(s) 802.

Based at least in part on the integration of the peer-to-peer payment platform and the payment processing platform (e.g., via the API 818), the server(s) 802 of the merchant platform 810 can exchange communications with a payment application 826 associated with the P2P platform 812 and/or the POS application 820 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 812 and merchant platform 810 (which can be a first- or third-party integration) such that a QR code, or other transaction code, specific to the transaction can be used for providing transaction details, location details, customer details, or the like to a computing device of the customer, such as the user device 806(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 806(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 820 and the payment application 826, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 806(B), can be specially configured as a buyer-facing device having functionality similar to the functionality described above in the brick-and-mortar example.

In some examples, based at least in part on capturing the QR code, or other transaction code, the merchant platform 810 can provide transaction data to the P2P platform 812 for presentation via the payment application 826 on the computing device of the customer, such as the user device 806B (B), to enable the customer to complete the transaction via their own computing device. In some examples, in response to receiving an indication that the QR code, or other transaction code, has been captured or otherwise interacted with via the customer computing device, the P2P platform 812 can determine that the customer authorizes payment of the transaction using funds associated with a stored balance of the customer that is managed and/or maintained by the P2P platform 812. Such authorization can be implicit such that the interaction with the transaction code can imply authorization of the customer. Alternatively or additionally, the P2P platform 812 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 812 can transfer funds from the stored balance of the customer to the merchant platform 810. In at least one example, the merchant platform 810 can deposit the funds, or a portion thereof, into a stored balance of the merchant that is managed and/or maintained by the merchant platform 810. In such an example, the merchant platform 810 can be a "peer" to the customer in a peer-to-peer transaction.

In some examples, techniques described herein can enable the customer to interact with the transaction after payment for the transaction has been settled. For example, in at least one example, the merchant platform 810 can cause a total amount of a transaction to be presented via a user interface associated with the payment application 826 such that the customer can provide gratuity, feedback, loyalty information, or the like, via an interaction with the user interface. In another example, the merchant platform 810 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 812, if the customer inputs a tip and/or an event affecting the total amount of the transaction is triggered, the P2P platform 812 can transfer additional funds, associated with the tip or event, to the merchant platform 810. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 826 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 812 as described herein (e.g., a debit card linked to a stored balance of a customer) such that when the payment instrument is caused to interact with a payment reader, the merchant platform 810 can exchange communications with the P2P platform 812 to authorize payment for a transaction and/or provision associated transaction data to a computing device of the customer associated with the transaction.

Turning now to media content functionality provided by the environment 800, the media content platform 814 can provide digital media to a content consumption device 806(D) where playback may occur using "streaming." In examples, "streaming" media content involves encoding the media content and transmitting the encoded media content over the network 804 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 814 can provide a digital media streaming service (e.g., subscription-based, non-subscription-based) that enables a content consumption device 806(D) to stream and/or download digital media content via a listener application 828 installed on the content consumption device 806(D). For instance, the media content platform 814 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 806(D), the listener application 828 may verify access rights to the digital media content items at time intervals, for instance intermittently (e.g., when the content consumption device 806(D) has a network connection with the media content platform 814 via the network(s) 804), and/or at regular intervals (e.g., daily, weekly, monthly, etc.). In examples, access rights to the digital media content items may be provided when a subscription to the media content platform 814 is active, while access rights to the digital media content items may be withheld when the subscription to the media content platform 814 is terminated. Enabling storage on the end user devices 806 and subsequent access to digital media content items via the listener application 828 provides the users 816 with the ability to access the digital media content items "offline" such as when a connection to the media content platform 814 via the network(s) 804 is unavailable or unreliable.

In some examples, the media content platform 814 may additionally or alternatively provide an artist management service that enables the users 816 to manage aspects of artist business via an artist application 830 installed on the artist user device 806(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 816 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 816 may have access to a single user account via respective end user devices 806, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 830 and the listener application 828 may be distinct applications having differing user experiences and verification processes for access, such as illustrated in the environment 800. For instance, the media content platform 814 may request additional verification, such as a link to an artist website, a sample of an artist's work, a verified credential supplied by a third party, etc. to grant access to the artist application 830 in addition to information requested to access the listener application 828. Further, the artist application 830 may provide the artist management services described herein, without the subscription-based digital media streaming services described herein, and vice versa. However, examples are also considered in which functionality provided by the artist application 830 and the listener application 828 partially or fully overlap, and/or where verification processes for access are substantially similar.

In at least some examples, the media content platform 814 enables interaction between the users 816 utilizing the listener application 828 installed on the content consumption devices 806(D), and the users 816 utilizing the artist application 830 installed on the artist user devices 806(E). For example, the media content platform 814 may provide interconnectivity between the subscription-based digital media streaming service and the artist management service. Functionality provided by the media content platform 814 in such instances may include a communication channel between one or more of the users 816 (e.g., a listener, fan, music supervisor, publisher, etc.) utilizing the listener application 828 and another user (e.g., an artist) of the users 816 utilizing the artist application 830. The communication channel may include, for instance, a messaging platform (also referred to as a "messaging application" herein), a live streaming platform, a videoconferencing or teleconferencing platform, and/or a combination of these.

Additionally, in some cases, the media content platform 814 may facilitate a resource transfer between the listener application 828 and the artist application 830. In an example, the media content platform 814 may direct a resource, such as a portion of a subscription fee paid by one of the users 816 designated as a listener, to one or more of the users 816 designated as artists based on a number of instances that the listening user consumed (e.g., streamed, downloaded, etc.) content created by respective ones of the artist users. Alternatively or additionally, the media content platform 814 may direct a resource, such as funds, from an account associated with a listening user to an account associated with an artist user (or vice versa), in accordance with transfers between accounts as described herein. The media content platform 814 may facilitate resource transfers in examples such as merchandise purchases, event ticket purchases, "tipping" an artist, payments for royalties or other fees, and so forth.

In some examples, the media content platform 814 enables interaction between individual ones of the users 816 with one another via the listener application 828 installed on the content consumption device 806(D) and other of the content consumption devices 806(D) via a communication channel as described above. In an example, the listener application 828 may provide functionality via a communication channel for a user to stream an individual digital media item, a playlist, or the like to an audience comprising other ones of the content consumption devices 806(D). Alternatively or additionally, the communication channel may facilitate sharing of individual digital media items, playlists, user and/or artist profiles, and the like between the users 816 via messages, uniform resource locators (URLs), quick response (QR) codes, and so forth.

In some cases, the media content platform 814 enables interaction between individual ones of the users 816 with one another via the artist application 830 installed on the artist user device 806(E) and other of the artist devices 806 via a communication channel as described above. In some instances, the media content platform 814 may provide recommendations for a particular user indicating which of the other users 816 to communicate with. Such a recommendation may be based on a similarity (or dissimilarity) of content created by two or more of the users 816, an overlap (or lack thereof) of audience members of the users 816, a geographic location of the users 816, a coinciding event location of the users 816, and so forth. In some examples, a user may input parameters for a desired connection via the artist application 830, and the media content platform 814 may filter which of the users 816 to surface for recommendations to the user based on the input parameters. Alternatively or additionally, the media content platform 814 may implement one or more machine learning models to filter which of the users 816 to surface for recommendations to the user. The recommendations provided by the media content platform 814 may be data driven and thus increase relevance of communications presented to the users 816 and reduce unsolicited communications that may be received by the users 816.

The media content platform 814 may interact with the server(s) 808 associated with the third-party service providers to, for instance, ingest digital media items, report digital media consumption data, pay royalties, and the like. In some examples, the server(s) 808 may be accessible by the media content platform 814 via one or more APIs 818 or other integrations. In some cases, the third-party service provider may be a digital media content provider (e.g., a record label, a performance rights organization (PRO), an independent artist, etc.). In such cases, the media content platform 814 may receive digital media content items from the server(s) 808, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 814 may use the metadata to associate the digital media content item as being created by a particular user, to provide search results to the users 816, to generate playlists, and so forth. Further, the media content platform 814 may provide payments (e.g., royalties) to the third-party service provider based on a number of streams and/or downloads of individual digital media content items by the users 806 via the listener application 828.

Techniques described herein are directed to services provided via a distributed system of end user devices 806 that are in communication with server(s) 802 of the service provider. That is, techniques described herein are directed to a specific implementation—or, a practical application—of utilizing a distributed system of end user devices 806 that are in communication with server(s) 802 of the merchant platform 810, the P2P platform 812, and/or the media content platform 814 to perform a variety of services, as described above. The unconventional configuration of the distributed system described herein enables the server(s) 802 that are remotely-located from end-users (e.g., users 816) to intelligently offer services based on aggregated data associated with the end-users, such as the users 816 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 810, the P2P platform 812, and/or the media content platform 814, and those outside of the control of these service providers, to track the standing (payables, receivables, payroll, invoices, appointments, capital, balances, collaborations, etc.) of the users 816. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 816 and end user devices 806. Furthermore, such features are changed dynamically based on the profiles of the users involved interacting with the GUIs. As such, techniques described herein are directed to improvements to computing systems.

The merchant platform 810, the P2P platform 812, and/or the media content platform 814 are capable of providing additional or alternative services, and the services described above are offered as a sampling of services. In at least one example, the merchant platform 810, the P2P platform 812, and/or the media content platform 814 can exchange data with the server(s) 808 associated with third-party service providers. Such third-party service providers can provide information that enables the merchant platform 810, the P2P platform 812, and/or the media content platform 814 to provide services, such as those described above. In additional or alternative examples, such third-party service providers can access services of the merchant platform 810, the P2P platform 812, and/or the media content platform 814. That is, in some examples, the third-party service providers can be subscribers, or otherwise access, services of the merchant platform 810, the P2P platform 812, and/or the media content platform 814.

FIG. 9 illustrates an example environment 900 including a service provider system 902 which may be associated with the server(s) 802 of FIG. 8. The environment 900 may also include a user device 904, which may correspond to any of the end user devices 806 described in relation to FIG. 8. In examples, the service provider system 902 may include one or a combination of the merchant platform 810, the P2P platform 812, or the media content platform 814, as well as one or more data store(s) 906 that can store assets in an asset storage 908, as well as data in user account(s) 910. In some examples, the data store(s) 906 may be the same as or similar to the data store(s) 116 introduced in FIG. 1. In some examples, the environment 900 may also include a public blockchain 914, one or more nodes 916, and/or a hardware wallet 918. The service provider system 902, the user device 904, public blockchain 914, the node(s) 916, and the hardware wallet 918 may be connected and able to communicate via one or more networks 920, which may have the same or similar functionality described in relation to the network 804 of FIG. 8.

In some examples, user account(s) 910 can include merchant account(s), customer account(s), media content subscriber account(s), artist account(s), and so forth. In at least one example, the asset storage 908 can be used to record whether individual assets are registered to a user account 910. For example, the asset storage 908 can include asset wallet(s) 922 for storing records of assets owned by the service provider system 902, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 808 of FIG. 8 can be associated therewith.

The asset wallet 922 can be associated with one or more addresses and can vary addresses used to acquire assets (e.g., from the asset network(s)) so that its holdings are represented under a variety of addresses on the asset network. In examples where the service provider system 902 has holdings of cryptocurrency (e.g., in the asset wallet 922), a user can acquire cryptocurrency directly from the service provider system 902. In some examples, the service provider system 902 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 902 can provide the same or similar functionality for securities or other assets.

The asset storage 908 may contain ledgers that store records of assignments of assets to users 816. Specifically, the asset storage 908 may include asset ledger 924, fiat currency ledger 926, and/or other ledger(s) 928, which can be used to record transfers of assets between users 816 and/or one or more third parties (e.g., merchant network(s), payment card network(s), ACH network(s), equities network(s), the asset network, securities networks, etc.). In doing so, the asset storage 908 can maintain a running balance of assets managed by the service provider system 902. The ledger(s) of the asset storage 908 can further indicate some of the running balance for individual ledger(s) stored in the asset storage 908 are assigned or registered to one or more user account(s) 910.

In at least one example, the asset storage 908 can include transaction logs 930, which can include, as transaction data, records of past transactions involving the service provider system 902 and/or the user account 910. In some examples, the data store(s) 906 can store a private blockchain 932. A private blockchain 932 can function to record sender addresses, recipient addresses, public keys, values of cryptocurrency transferred, and/or can be used to verify ownership of cryptocurrency tokens to be transferred. In some examples, the service provider system 902 can record transactions involving cryptocurrency until the number of transactions has exceeded a determined limit (e.g., number of transactions, storage space allocation, etc.). Based at least in part on determining that the limit has been reached, the service provider system 902 can publish the transactions in the private blockchain 932 to the public blockchain 914 (e.g., associated with the asset network), where miners can verify the transactions and record the transactions to blocks on the public blockchain 914. In at least one example, the service provider system 902 can participate as miner(s) at least for transactions to which the respective platform is a party to, to be posted to the public blockchain 914.

In some cases, the data store(s) 906 can store and/or manage multiple user accounts, an example of which is described in relation to the user account 910. In at least one example, the user account 910 can include user account data 934, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 934 can include account activity 936 and user wallet key(s) 938. In some examples, the user wallet key(s) 938 can include a public-private key-pair and a respective address associated with the asset network or other asset networks. In some examples, the user wallet key(s) 938 may include one or more key pairs, which can be unique to the asset network or other asset networks.

In addition to the user account data 934, the user account 910 can include ledger(s) for account(s) managed by the service provider system 902, for the user. For example, the user account 910 may include an asset ledger 924, a fiat currency ledger 926, and/or one or more other ledgers 928. The ledger(s) can indicate that a corresponding user utilizes the service provider system 902 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 902.

In some examples, the asset ledger 924 can store a balance for each of one or more cryptocurrencies (e.g., Bitcoin, Ethereum, Litecoin, etc.) registered to the user account 910. In at least one example, the asset ledger 924 can further record transactions of cryptocurrency assets associated with the user account 910. For example, the user account 910 can receive cryptocurrency from the asset network using the user wallet key(s) 938. In some examples, the user wallet key(s) 938 may be generated for the user upon request. User wallet key(s) 938 can be requested by the user in order to send, exchange, or otherwise control the balance of cryptocurrency held by the service provider system 902 (e.g., in the asset wallet 922) and registered to the user. In some examples, the user wallet key(s) 938 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 902 and the value is credited as a balance in asset ledger 924), by purchasing currency in the form associated with the account using currency in a different form (e.g., buying a value of cryptocurrency from the service provider system 902 using a value of fiat currency reflected in fiat currency ledger 926, and crediting the value of cryptocurrency in asset ledger 924), or by conducting a transaction with another user (customer or merchant) of the service provider system 902 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 902 (i.e., an external account). Such a transaction can request that the user to transfer an amount of the cryptocurrency in a message signed by user's private key to an address provided by the service provider system 902. In at least one example, the transaction can be sent to miners to bundle the transaction into a block of transactions and to verify the authenticity of the transactions in the block. Once a miner has verified the block, the block is written to the public blockchain 914 where the service provider system 902 can then verify that the transaction has been confirmed and can credit the user's asset ledger 924 with the transferred amount. When an account is funded by transferring cryptocurrency from a third-party cryptocurrency wallet, an update can be made to the public blockchain 914. In some cases, this update of the public blockchain 914 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 902. As described above, in some examples, the service provider system 902 can acquire cryptocurrency from a third-party source. In examples where the service provider system 902 has its own crypto-currency assets, cryptocurrency transferred in a transaction (e.g., data with address provided for receipt of transaction and a balance of cryptocurrency transferred in the transaction) can be stored in an asset wallet 922 associated with the service provider system 902. In at least one example, the service provider system 902 can credit the asset ledger 924 of the user. Additionally, while the service provider system 902 recognizes that the user retains the value of the transferred cryptocurrency through crediting the asset ledger 924, an inspection of the blockchain will show the cryptocurrency as having been transferred to the service provider system 902. In some examples, the asset wallet 922 can be associated with many different addresses. In such examples, an inspection of the blockchain may not necessarily associate all cryptocurrency stored in asset wallet 922 as belonging to the same entity. The presence of a private ledger used for real-time transactions and maintained by the service provider system 902, combined with updates to the public ledger at other times, allows for extremely fast transactions using cryptocurrency to be achieved. In some examples, the "private ledger" can refer to the asset ledger 924, which in some examples, can utilize the private blockchain 932, as described herein. The "public ledger" can correspond to the public blockchain 914 associated with the asset network.

In at least one example, an asset ledger 924, fiat currency ledger 926, or the like associated with the user account 910 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 924. In some examples, a user can receive fiat currency or another currency in the form of payment for a transaction with another user. In at least one example, at least a portion of such funds can be converted into cryptocurrency by the service provider system 902 and used to fund the asset ledger 924 of the user.

In examples, a user can also have an account in U.S. dollars, which can be tracked, for example, via the fiat currency ledger 926. Such an account can be funded by transferring money from a bank account at a third-party bank to an account maintained by the service provider system 902 as is conventionally known. In some examples, a user can receive fiat currency in the form of payment for a transaction with another user. In such examples, at least a portion of such funds can be used to fund the fiat currency ledger 926.

In some examples, a user can have one or more internal payment cards registered with the service provider system 902. Internal payment cards can be linked to one or more of the accounts associated with the user account 910. In some embodiments, options with respect to internal payment cards can be adjusted and managed using an application (e.g., the payment application 826, a wallet application 912, etc.).

In at least one example, the user account 910 can be associated with the asset wallet accessible via a wallet application 912 of the user device 904, or a stored balance for use in payment transactions, peer-to-peer transactions, payroll payments, etc. In at least one example, the asset wallet 922 can store data indicating an address provided for receipt of a cryptocurrency transaction. In at least one example, the balance of the asset wallet 922 can be based at least in part on a balance of the asset ledger 924. In at least one example, funds availed via the asset wallet 922 can be stored in the asset wallet 922. Funds availed via the asset wallet 922 can be tracked via the asset ledger 924. The asset wallet 922, however, can be associated with additional cryptocurrency funds.

In at least one example, when the service provider system 902 includes a private blockchain 932 for recording and validating cryptocurrency transactions, the asset wallet 922 can be used instead of, or in addition to, the asset ledger 924. For example, a merchant can provide the address of the asset wallet 922 for receiving payments. In an example where a customer is paying in cryptocurrency and the customer has their own cryptocurrency wallet account associated with the service provider system 902, the customer can send a message signed by its private key including its wallet address (i.e., of the customer) and identifying the crypto-currency and value to be transferred to the merchant's asset wallet 922. The service provider system 902 can complete the transaction by reducing the cryptocurrency balance in the customer's cryptocurrency wallet and increasing the cryptocurrency balance in the merchant's asset wallet 922. In addition to recording the transaction in the respective cryptocurrency wallets, the transaction can be recorded in the private blockchain 932 and the transaction can be confirmed. A user can perform a similar transaction with cryptocurrency in a peer-to-peer transaction as described above.

While the asset ledger 924 and/or asset wallet 922 are each described above with reference to cryptocurrency, the asset ledger 924 and/or asset wallet 922 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 902 is an aspect of the technology disclosed that enables technical advantages of increased processing speed and improved security.

The description of the environment 900 above generally relates to a centralized service provider system 902 that at least partially facilitates storing and managing assets in the data store 906. However, the environment 900 may also facilitate decentralized storage and management of assets alternatively or in addition to centralized storage and management as described above. For instance, the environment 900 may include a decentralized platform implemented using a plurality of nodes (e.g., web nodes), an example of which is illustrated as node 916. The node 916 is representative of a computer or other device tasked with validating transactions and/or maintaining a copy of a blockchain ledger, such as a ledger associated with the public blockchain 914. The decentralized platform may be implemented via the environment 900 through use of decentralized identifiers and verifiable credentials that are stored and managed by user devices 904. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 902). The decentralized identity referenced by a decentralized identifier gives an entity control over what data can be accessed, stored, modified, and so forth by other entities, such as the service provider system 902.

The node 916, as representative of one of a plurality of decentralized nodes (e.g., decentralized web nodes), supports data storage and relays that allows entities, service provider systems, individuals, organizations and so forth to send, store, and receive encrypted or public messages and data. The node 916 is universally addressable and is "crawlable" using data addressing in relation to the decentralized identifiers. The node 916 is also configured to support decentralized replication of data across the nodes that is consistent across multiple nodes over time through continued data communication between the nodes in the decentralized platform. The node 916 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 904 may be an issuer, a holder, and/or a verifier, as can the service provider system 902.

In some examples, the user device 904 may implement a wallet application 912 configured to manage decentralized identifiers and/or verifiable credentials. For instance, the wallet application 912 may provide a user interface for implementation of access controls to various data associated with the decentralized identifier by the service provider system 902, to other user devices, and so forth. Additionally, the wallet application 912 may be configured to provide functionality for resource transfers (e.g., cryptocurrency, fiat currency, etc.) with the service provider system 902, other user devices, and the like, based on techniques described herein.

In some examples, the hardware wallet 918 may store cryptocurrency assets in combination with the wallet application 912 and the service provider system 902. For instance, the hardware wallet 918, the wallet application 912, and the service provider system 902 may each store a respective, different private key, where a transaction with the cryptocurrency assets is signed by at least two of the three private keys. The user interface provided by the wallet application 912 may allow a user to request a transaction. The wallet application 912 may then sign the transaction with the private key of the wallet application 912, have either the hardware wallet 918 or the service provider system 902 use a second of the three private keys to sign the transaction, and then provide the transaction with two signatures to the public blockchain 914 for processing.

Figure 10:
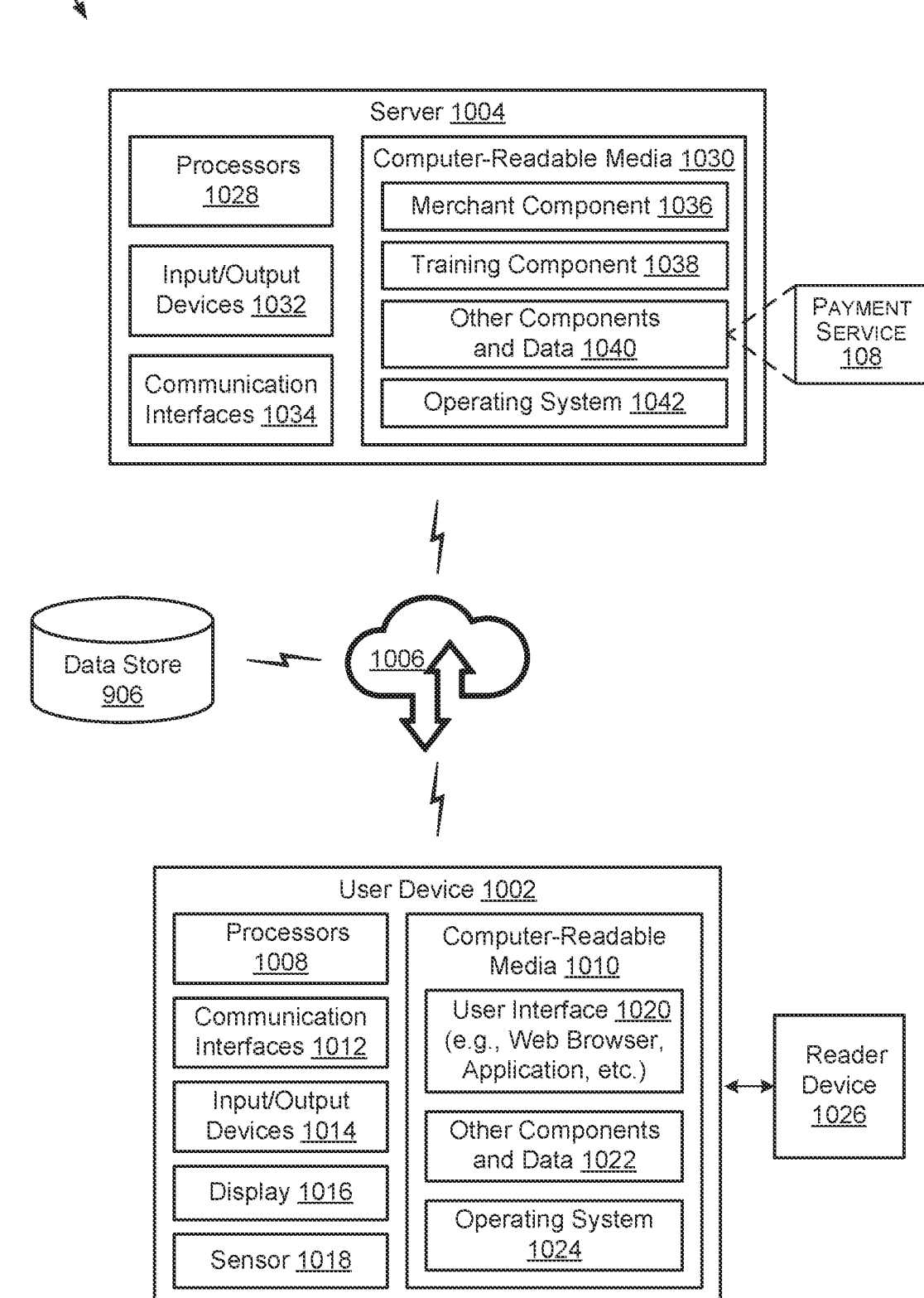
FIG. 10 is an example data store used for performing techniques described herein.

FIG. 10 depicts an illustrative block diagram illustrating a system 1000 for performing techniques described herein. The system 1000 includes a user device 1002, that communicates with server computing device(s) (e.g., server(s) 1004) via network(s) 1006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1002 is illustrated, in additional or alternate examples, the system 1000 can have multiple user devices, as described above with reference to FIG. 8.

In some examples, the server(s) 1004 may be the same as or similar to the server(s) 112 introduced in FIG. 1, and the server(s) 1004 may implement the payment service 108, which may include the AI model(s) 130, the metric component 132, the incentive component 134, and/or the optimization component 136, as described herein. Furthermore, the user device 1002 may be the same as or similar to the electronic device 104 introduced in FIG. 1, and the network(s) 1006 may be the same as or similar to the network(s) 114 introduced in FIG. 1.

In accordance with the examples described herein, the server(s) 1004 may optimize the presentation of data. For instance, the server(s) 1004 may apply a trained AI model to user data associated with users of a payment service 108, wherein the trained AI model associates a value with each of the users, and wherein the value represents a predicted engagement metric indicating a change in a level of engagement if an individual user of the users is offered an incentive having a particular attribute. The server(s) 1004 may generate the incentive having the particular attribute, identify a subset of the users based at least in part on the value, and cause the incentive to be presented via a user interface 1020 of a payment application associated with the payment service 108 and executing on a device 1002 of a user in the subset.

In at least one example, the user device 1002 can be any suitable type of computing device, e.g., portable, semi-portable, semi-stationary, or stationary. Some examples of the user device 1002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1002 can be any computing device capable of sending communications and performing the functions according to the techniques described herein. The user device 1002 can include devices, e.g., payment card readers, or components capable of accepting payments, as described below. The user device 1002 may be representative of, and provide functionality for, the user devices 806 described in relation to FIG. 8.

In the illustrated example, the user device 1002 includes one or more processors 1008, one or more computer-readable media 1010, one or more communication interface(s) 1012, one or more input/output (I/O) devices 1014, a display 1016, sensor(s) 1018, one or more encoders 1046, and one or more decoders 1048.

In at least one example, each processor 1008 can itself comprise one or more processors or processing cores. For example, the processor(s) 1008 can be implemented as one or more microprocessors, microcomputers, microcontrollers, digital signal processors, central processing units, state machines, logic circuitries, and/or any devices that manipulate signals based on operational instructions. In some examples, the processor(s) 1008 can be one or more hardware processors and/or logic circuits of any suitable type specifically programmed or configured to execute the algorithms and processes described herein. The processor(s) 1008 can be configured to fetch and execute computer-readable processor-executable instructions stored in the computer-readable media 1010.

Depending on the configuration of the user device 1002, the computer-readable media 1010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1010 can include, but is not limited to, RAM, ROM, EEPROM, flash memory, solid-state storage, magnetic disk storage, optical storage, and/or other computer-readable media technology. Further, in some examples, the user device 1002 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 can be computer storage media able to store instructions, components or components that can be executed by the processor(s) 1008. Further, when mentioned, non-transitory computer-readable media exclude media such as energy, carrier signals, electromagnetic waves, and signals per se.

The computer-readable media 1010 can be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the user device 1002. Functional components stored in the computer-readable media 1010 can include a user interface 1020 to enable users to interact with the user device 1002, and thus the server(s) 1004 and/or other networked devices. In some examples, the user interface 1020 can be the user interfaces 126, 200A, and/or 200B described above. In at least one example, a user can interact with the user interface via touch input, spoken input, gesture, or any other type of input. The word "input" is also used to describe "contextual" input that may not be directly provided by the user via the user interface 1020. For example, user's interactions with the user interface 1020 are analyzed using, e.g., natural language processing techniques, user movement tracking techniques, eye tracking techniques, etc. to determine context or intent of the user, which may be treated in a manner similar to "direct" user input.

Depending on the type of the user device 1002, the computer-readable media 1010 can also optionally include other functional components and data, such as other components and data 1022, which can include programs, drivers, etc., and the data used or generated by the functional components. In addition, the computer-readable media 1010 can also store data, data structures and the like, that are used by the functional components. Further, the user device 1002 can include many other logical, programmatic and physical components, of which those described are merely examples that are related to the discussion herein.

In at least one example, the computer-readable media 1010 can include additional functional components, such as an operating system 1024 for controlling and managing various functions of the user device 1002 and for enabling user interactions.

The communication interface(s) 1012 can include one or more interfaces and hardware components for enabling communication with various other devices, such as over the network(s) 1006 or directly. For example, communication interface(s) 1012 can enable communication through one or more network(s) 1006, which can include, but are not limited to any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1002 can further include one or more input/output (I/O) devices 1014. The I/O devices 1014 can include speakers, a microphone, a camera, and various user controls (e.g., buttons, a joystick, a keyboard, a keypad, etc.), a haptic output device, and so forth. The I/O devices 1014 can also include attachments that leverage the accessories (audio-jack, USB-C, Bluetooth, etc.) to connect with the user device 1002.

In at least one example, user device 1002 can include a display 1016. Depending on the type of computing device(s) used as the user device 1002, the display 1016 can employ any suitable display technology. For example, the display 1016 can be a liquid crystal display, a plasma display, a light emitting diode display, an OLED (organic light-emitting diode) display, an electronic paper display, or any other suitable type of display able to present digital content thereon. In at least one example, the display 1016 can be an augmented reality display, a virtual reality display, or any other display able to present and/or project digital content. In some examples, the display 1016 can have a touch sensor associated with the display 1016 to provide a touchscreen display configured to receive touch inputs for enabling interaction with a graphic interface presented on the display 1016. Accordingly, implementations herein are not limited to any particular display technology. In some examples, the user device 1002 may not include the display 1016, and information can be presented by other means, such as aurally, haptically, etc.

In addition, the user device 1002 can include sensor(s) 1018. The sensor(s) 1018 can include a global positioning system ("GPS") device able to indicate location information. Further, the sensor(s) 1018 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 810, the P2P platform 812, and/or the media content platform 814, described above, to provide one or more services. That is, in some examples, the service provider can implement geofencing to provide particular services to users by the merchant platform 810, the P2P platform 812, and/or the media content platform 814.

In examples, the user device 1002 includes a codec system, which may comprise an encoder 1046 and/or a decoder 1048. The encoder 1046 is configured to encode a data stream or signal from an analog signal (e.g., an analog audio signal, an analog video signal, etc.) to a digital signal for transmission or storage. The decoder 1048 is configured to convert the digital signal back to an analog signal, such as for playback or editing. In some cases, the encoder 1046 may be configured to encode the data stream or analog signal in an encrypted format, and the decoder 1048 may accordingly be configured to decrypt the digital signal as part of the decoding process (e.g., using a cryptographic key). Additionally, in some examples, the encoder 1046 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1046 and/or the decoder 1048 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1000, the server 1004 may include an encoder 1046 and/or a decoder 1048 as well.

Additionally, the user device 1002 can include various other components that are not shown, examples of which include removable storage, a power source, such as a battery and power control unit, a barcode scanner, a printer, a cash drawer, and so forth.

In addition, as described in relation to FIG. 8, the user device 1002 can include, be connectable to, or otherwise be coupled to a reader device 1026, for reading payment instruments and/or identifiers associated with payment objects. The reader device 1026 can include a read head for reading a magnetic strip of a payment card, and further can include encryption technology for encrypting the information read from the magnetic strip. Additionally or alternatively, the reader device 1026 can be an EMV payment reader, which in some examples, can be embedded in the user device 1002. Moreover, numerous other types of readers can be employed with the user device 1002 herein, depending on the type and configuration of the user device 1002.

The reader device 1026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1026 may include hardware implementation, such as slots, magnetic tracks, and rails with one or more sensors or electrical contacts to facilitate detection and acceptance of a payment instrument. That is, the reader device 1026 may include hardware implementations to enable the reader device 1026 to interact with a payment instrument via a swipe, a dip, or a tap to obtain payment data associated with a customer. Additionally or optionally, the reader device 1026 may also include a biometric sensor to receive and process biometric characteristics and process them as payment instruments, given that such biometric characteristics are registered with the payment service and connected to a financial account with a bank server. The reader device 1026 may include processing unit(s), computer-readable media, a reader chip, a transaction chip, a timer, a clock, a network interface, a power supply, and so on. That is, the reader device 1026 may include any of the computing components described herein with reference to the user device 1002 to implement the functionality provided by the reader device 1026.

In examples, the reader device 1026 includes a reader chip, which may perform functionality to control the power supply, among other functionality of the reader device 1026. The power supply may include one or more power supplies such as a physical connection to AC power or a battery. Power supply may include power conversion circuitry for converting AC power and generating a plurality of DC voltages for use by components of reader device 1026. When power supply includes a battery, the battery may be charged via a physical power connection, via inductive charging, or via any other suitable method.

The reader device 1026 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1002, which can be a POS terminal, and the reader device 1026 are shown as separate devices, in additional or alternative examples, the user device 1002 and the reader device 1026 can be part of a single device, which may be a battery-operated device. In some examples, the reader device 1026 can have a display integrated therewith, which can be in addition to (or as an alternative of) the display 1016 associated with the user device 1002.

The server(s) 1004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1004 can include one or more processors 1028, one or more computer-readable media 1030, one or more I/O devices 1032, and one or more communication interfaces 1034. Each processor 1028 can be a single processing unit or a number of processing units, and can include single or multiple computing units or multiple processing cores. The processor(s) 1028 can be implemented as one or more microprocessors, microcomputers, microcontrollers, digital signal processors, central processing units, state machines, logic circuitries, and/or any devices that manipulate signals based on operational instructions. For example, the processor(s) 1028 can be one or more hardware processors and/or logic circuits of any suitable type specifically programmed or configured to execute the algorithms and processes described herein. The processor(s) 1028 can be configured to fetch and execute computer-readable instructions stored in the computer-readable media 1030, which can program the processor(s) 1028 to perform the functions described herein.

The computer-readable media 1030 can include volatile and nonvolatile memory and/or removable and non-removable media implemented in any type of technology for storage of information, such as computer-readable instructions, data structures, program components, or other data. Such computer-readable media 1030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1004, the computer-readable media 1030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1030 can be used to store any number of functional components that are executable by the processor(s) 1028. In many implementations, these functional components comprise instructions or programs that are executable by the processors 1028 and that, when executed, specifically configure the one or more processors 1028 to perform the actions attributed above to the merchant platform 810, the P2P platform 812, and/or the media content platform 814. Functional components stored in the computer-readable media 1030 can optionally include a merchant component 1036, a training component 1038, and one or more other components and data 1040. In some examples, the one or more other components and data 1040 may include the payment service 108, which may include the AI model(s) 130, the metric component 132, the incentive component 134, and/or the optimization component 136, as described herein. The computer-readable media 1030 can additionally include an operating system 1042 for controlling and managing various functions of the server(s) 1004.

The merchant component 1036 can be configured to receive transaction data from POS systems, such as the POS system 824 described above with reference to FIG. 8. The merchant component 1036 can transmit requests (e.g., authorization, capture, settlement, etc.) to payment service server computing device(s) to facilitate POS transactions between merchants and customers. The merchant component 1036 can communicate the successes or failures of the POS transactions to the POS systems.

The training component 1038 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1002 and/or the server(s) 1004 for use at a time after the data models have been trained (e.g., at runtime).

The one or more other components and data 1040 can include the payment service 108, which may include the AI model(s) 130, the metric component 132, the incentive component 134, and/or the optimization component 136, the functionality of which is described, at least partially, above. Further, the one or more other components and data 1040 can include programs, drivers, etc., and the data used or generated by the functional components. Further, the server(s) 1004 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1034 can include one or more interfaces and hardware components for enabling communication with various other devices, such as over the network(s) 1006 or directly. For example, communication interface(s) 1034 can enable communication through one or more network(s) 1006, which can include, but are not limited to any type of network known in the art, as described herein.

The server(s) 1004 can further be equipped with various I/O devices 1032. Such I/O devices 1032 can include a display, various user interface controls (e.g., buttons, joystick, keyboard, mouse, touch screen, biometric or sensory input devices, etc.), audio speakers, connection ports and so forth.

In at least one example, the system 1000 can include a datastore 1044 that can be configured to store data that is accessible, manageable, and updatable. In some examples, the datastore 1044 can be integrated with the user device 1002 and/or the server(s) 1004. In other examples, as shown in FIG. 10, the datastore 1044 can be located remotely from the server(s) 1004 and can be accessible to the server(s) 1004. The datastore 1044 can comprise multiple databases and/or servers connected locally and/or remotely via the network(s) 1006. In at least one example, the datastore 1044 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:

collecting, by a payment service computing platform, over a network, user data associated with users of a payment service based on: (i) interactions between the users and a payment application associated with the payment service and executing on devices of the users, and (ii) transactions completed by the users using a payment instrument associated with the payment service;

training, by the payment service computing platform, an artificial intelligence (AI) model using the user data to obtain a trained AI model;

generating, by the payment service computing platform, and using the trained AI model to process the user data to identify usage patterns associated with the payment instrument, a value associated with each of the users, wherein the value represents a predicted engagement metric indicating an amount of fiat currency an individual user of the users is predicted to spend over a period of time using the payment instrument in response to the individual user being offered an incentive having a particular attribute;

generating, by the payment service computing platform, the incentive having the particular attribute;

identifying, by the payment service computing platform, a subset of the users based on the value;

causing, by the payment service computing platform, the incentive to be presented via a user interface of the payment application executing on a device of a user in the subset, wherein the incentive is associated with an inactive state when presented via the user interface;

receiving, by the payment service computing platform, an indication of an input indicating a selection of the incentive; and based at least in part on receiving the indication of the input, activating, by the payment service computing platform, the incentive to an active state, wherein the active state causes the incentive to be conditionally redeemable in association with a future transaction for which payment is made using the payment instrument.

2. The computer-implemented method of claim 1, wherein the training comprises training the AI model based on features of the user data, the features comprising:

usage patterns associated with the payment application;

stored balances associated with the payment application; or the usage patterns associated with the payment instrument.

3. The computer-implemented method of claim 1, further comprising:

accessing, by the payment service computing platform, incentive data associated with incentives made available to the users by the payment service, wherein the training further comprises training the AI model based on features of the incentive data, the features comprising:

amounts of discounts;

amounts of fiat currency;

offer frequencies;

time periods for which the incentives are active;

merchants; or types of the incentives.

4. The computer-implemented method of claim 1, wherein the generating of the incentive comprises using a second trained AI model to determine the particular attribute for the incentive.

5. A system comprising:

one or more processors; and memory storing computer-executable instructions that, when executed by the one or more processors, cause the one or more processors to perform operations comprising:

collecting, over a network, user data associated with users of a payment service based on: (i) interactions between the users and a payment application associated with the payment service and executing on devices of the users, and (ii) transactions completed by the users using a payment instrument associated with the payment service;

generating, using a trained artificial intelligence (AI) model to process the user data to identify usage patterns associated with the payment instrument, a value associated with each of the users, wherein the value represents a predicted engagement metric indicating an amount of fiat currency an individual user of the users is predicted to spend over a period of time using the payment instrument if the individual user is offered an incentive having a particular attribute;

generating the incentive having the particular attribute;

identifying a subset of the users based at least in part on the value; and causing the incentive to be presented via a user interface of the payment application and executing on a device of a user in the subset.

6. The system of claim 5, wherein the incentive is presented via the user interface as one of multiple incentives available for selection, the operations further comprising:

collecting engagement data associated with the user, the engagement data indicating which of the multiple incentives the user selected; and using the engagement data to retrain the trained AI model.

7. The system of claim 5, the operations further comprising:

dynamically determining a merchant preferred by the user based at least in part on the user data associated with the user, wherein the incentive is conditionally redeemable in association with a future transaction with the merchant.

8. The system of claim 5, wherein the incentive is conditionally redeemable in association with a future transaction for which payment is made using the payment instrument.

9. The system of claim 5, the operations further comprising dynamically determining a number of the users in the subset based at least in part on a cost of offering the incentive and a fixed budget.

10. The system of claim 5, the operations further comprising, prior to the generating of the value, training an AI model based at least in part on features of the user data to obtain the trained AI model, the features comprising:

usage patterns associated with the payment application;

stored balances associated with the payment application; or the usage patterns associated with the payment instrument.

11. The system of claim 5, the operations further comprising, prior to the generating of the value, training an AI model based at least in part on features of incentive data associated with incentives made available to the users by the payment service to obtain the trained AI model, the features comprising:

amounts of discounts;

offer frequencies;

merchants; or reward types.

12. The system of claim 5, the operations further comprising, prior to the causing of the incentive to be presented via the user interface, causing a message to be presented via the payment application, the message notifying the user about an availability of the incentive.

13. The system of claim 5, wherein the generating of the incentive comprises using a second trained AI model to determine the particular attribute for the incentive.

14. A computer-implemented method comprising:

collecting, by a payment service computing platform, over a network, user data associated with users of a payment service based on: (i) interactions between the users and a payment application associated with the payment service and executing on devices of the users, and (ii) transactions completed by the users using a payment instrument associated with the payment service;

generating, by the payment service computing platform, and using a trained artificial intelligence (AI) model to process the user data to identify usage patterns associated with the payment instrument, a value associated with each of the users, wherein the value represents a predicted engagement metric indicating an amount of fiat currency an individual user of the users is predicted to spend over a period of time using the payment instrument in response to the individual user being offered an incentive having a particular attribute;

generating, by the payment service computing platform, the incentive having the particular attribute;

identifying, by the payment service computing platform, a subset of the users based at least in part on the value; and causing, by the payment service computing platform, the incentive to be presented via a user interface of the payment application executing on a device of a user in the subset.

15. The computer-implemented method of claim 14, further comprising:

receiving, by the payment service computing platform, requests from multiple users, including the user, to redeem the incentive in association with transactions involving the payment instrument;

dynamically increasing, by the payment service computing platform, and based at least in part on the receiving of the requests, an amount of a discount associated with the incentive to obtain an increased discount; and redeeming, by the payment service computing platform, the incentive in association with the transactions, wherein the increased discount is applied to respective payments made by the multiple users for completing the transactions.

16. The computer-implemented method of claim 14, wherein the incentive is associated with an inactive state when presented via the user interface, the computer-implemented method further comprising:

receiving, by the payment service computing platform, an indication of an input indicating a selection of the incentive; and based at least in part on receiving the indication of the input, activating, by the payment service computing platform, the incentive to an active state, wherein the active state causes the incentive to be conditionally redeemable for a limited period of time or at a particular location in association with a future transaction for which payment is made using the payment instrument.

17. The computer-implemented method of claim 14, further comprising dynamically determining, by the payment service computing platform, the particular attribute for the incentive based at least in part on the user data, wherein, prior to the generating of the incentive, a set of existing incentives made available to the users by the payment service did not include the incentive having the particular attribute.

18. The computer-implemented method of claim 14, wherein the generating of the incentive comprises using a second trained AI model to determine the particular attribute for the incentive.

*   *   *   *   *